United States Patent
Forbes et al.

(10) Patent No.: US 6,996,076 B1
(45) Date of Patent: Feb. 7, 2006

(54) SYSTEM AND METHOD TO INTERNETWORK WIRELESS TELECOMMUNICATION NETWORKS

(75) Inventors: Brian M. Forbes, Plano, TX (US); Casimer M. Kaczmarczyk, Plano, TX (US)

(73) Assignee: Sonus Networks, Inc., Chelmsford, MA (US)

( * ) Notice: Subject to any disclaimer, the term of this patent is extended or adjusted under 35 U.S.C. 154(b) by 1022 days.

(21) Appl. No.: 09/821,508

(22) Filed: Mar. 29, 2001

(51) Int. Cl.
*H04B 7/00* (2006.01)

(52) U.S. Cl. .................... 370/310; 370/401; 370/466; 709/249

(58) Field of Classification Search ......... 370/310–330, 370/335–350, 401, 464–469; 709/249; 455/433
See application file for complete search history.

(56) References Cited

U.S. PATENT DOCUMENTS

| | | | |
|---|---|---|---|
| H1837 H | * 2/2000 | Fletcher | 144/134.1 |
| 6,563,919 B1 | * 5/2003 | Aravamudhan et al. | 379/230 |
| 6,785,730 B1 | * 8/2004 | Taylor | 709/230 |
| 2002/0018487 A1 | * 2/2002 | Chen et al. | 370/465 |
| 2002/0059425 A1 | * 5/2002 | Belfiore et al. | 709/226 |

\* cited by examiner

*Primary Examiner*—Hassan Kizou
*Assistant Examiner*—Dmitry Levitan
(74) *Attorney, Agent, or Firm*—Proskauer Rose LLP

(57) ABSTRACT

One aspect of the invention is a method for wireless call processing. The method includes downloading at least one function-specific logic control program into each of a plurality of generic logic control state machines and receiving a message at a wireless protocol-specific codec, parsing the message, and routing the message to a first logic control state machine associated with the protocol-specific codec. The method also includes executing the function-specific logic control program of a first logic control state machine and generating a call event and routing the call event to an event codec. The method also includes executing the function-specific logic control program of a second logic control state machine and processing the call event. In a particular embodiment, the method also includes allocating an RF channel that may be used for the call event without seizing the RF channel. In another embodiment, the method also includes accessing a database that includes routing and verification information related to the call event, and routing the call event in response to the information.

7 Claims, 14 Drawing Sheets

SYSTEM AND METHOD TO INTERNETWORK WIRELESS TELECOMMUNICATION NETWORKS

TECHNICAL FIELD OF THE INVENTION

This invention is related in general to the field of telecommunications systems and methods and more particularly to a system and method to internetwork wireless telecommunication networks.

BACKGROUND OF THE INVENTION

A number of wireless systems have evolved through the years. For example, the analog mobile phone service (AMPS) utilizes a portion of the spectrum to support wireless communication. The AMPS system includes an air interface whose management is closely coupled to circuit switches used for the particular technology. Since then, a variety of other systems have evolved that facilitate digital cellular phone service, each with their own protocols and/or interfaces. These systems include call division multiple access (CDMA), time division multiple access (TDMA), and group special mobile, or global system for mobile communications (GSM). Unfortunately, none of these systems may interface with one another. For example, if an operator wants to purchase another wireless operator install network, new switching platforms must be accrued and managed to support the different interfaces.

In an effort to increase the types of data that may be sent to wireless devices such as mobile phones and personal digit assistants (PDAs), a variety of next generation or third-generation (3G) systems include functionality that provide for true wide-band or broadband for video, Internet Protocol (IP) and Internet access by adding packet network applications directly to a mobile phone using protocols such as Wireless Access Protocol (WAP). These systems, including wideband CDMA (W-CDMA), DMA1, CDMA2000, wideband TDMA (W-TDMA), WGSM, and other proposed 3G wireless systems utilize both a traditional circuit switch to control the air interface and voice only calls, as well as packet switches with associated gateways at a base station, authenticators, and application servers to support these new applications. However, the addition of new protocols such as IP to wireless networks has only compounded the complexity of verification, authentication and routing of various data and services using these systems.

Furthermore, in any of these systems, the mobile phone "hand-off" or "hand-over" process required to transfer control of devices such as mobile phones from one antenna, tower, or cell the next as the mobile phone moves, is very circuit switch inefficient. That is, this process requires multiple circuits or ports on a circuit switch to handle the call so that it is not dropped or disconnected, and so that no discontinuities or interruptions are heard in the voice service by the user.

SUMMARY OF THE INVENTION

From the foregoing, it may be appreciated that a need has arisen for a system and method to internetwork wireless telecommunication networks. In accordance with teachings of the present invention, a system and method are provided that substantially reduce or eliminate disadvantages and problems of conventional wireless systems.

One aspect of the invention is a method for wireless call processing. The method includes downloading at least one function-specific logic control program into each of a plurality of generic logic control state machines and receiving a message at a wireless protocol-specific codec, parsing the message, and routing the message to a first logic control state machine associated with the protocol-specific codec. The method also includes executing the function-specific logic control program of a first logic control state machine and generating a call event and routing the call event to an event codec. The method also includes executing the function-specific logic control program of a second logic control state machine and processing the call event. In a particular embodiment, the method also includes allocating an RF channel that may be used for the call event without seizing the RF channel. In another embodiment, the method also includes accessing a database that includes routing and verification information related to the call event, and routing the call event in response to the information.

The invention provides several technical advantages. Various embodiments of the invention may have none, some, or all of these advantages. For example, the invention may provide the technical advantage of enabling operators of wireless systems to provide switching control in a single platform while removing dependencies on protocols and/or air interfaces of different systems. Another technical advantage of the invention is that the invention may provide effective control for high-bandwidth applications such as video and Internet protocol (IP) and Internet applications without regard to the air interface used. In effect, a single platform may provide portability for logic, data, and services, which in turn allows these elements to operate independently of ports and to serve a wider coverage area. For example, the invention may efficiently provide access to databases for services such as billing and sales in conjunction with data registers such as Home Location Register (HLR) and/or Visitors Location Register (VLR). Such an advantage may enable new subscriber management, and reduce the redundancy and the complexity of database requirements. For example, the invention may include hand-over requirements and functionality to efficiently move a mobile device such as a mobile phone from a first covered area to another covered area. Another technical advantage of the invention is that the invention may provide base station radio control. For example, configuration information may be received from a service node and preserved in the service node as a universal location register. In this way, mobile location information may be received from any radio frequency interface and/or gateway and control a mobile device using the register.

Another technical advantage of the invention is that the invention may provide a system and method that may be used with existing systems and may provide a seamless transition from existing networks while providing an IP infrastructure to support newer, 3G networks. Another technical advantage of the present invention is that the invention improve network efficiency by reserving and allocating, rather than seizing, channels. Rather than routing bearer channels, the invention looks for an optimal virtual route from distributed ports on the edge of a network (e.g., a base station RF 'channel'). Utilizing control information, the switch may determine origination and termination and route sessions either between adjacent base stations or across the country using voice over IP (VoIP) routing.

For example, the invention provides design flexibility in allowing control of several distributed switches and base stations as a single unified network. Another technical advantage of the invention is that the distributed switching allows cells to be connected any-to-any through IP, thus improving the drawbacks that are typically associated with physical point-to-point connectivity achieved by traditional Public Switched Telephone Networks (PSTNs) technology. For example, circuit switching technology typically requires constant traffic engineering as cells are added or divided, and consumes land line and mobile switching center ports even when they are not utilized. As another example, long distance calling requires the PSTN to be used as a transport network between mobile switching centers, which also requires constant traffic engineering and utilizes inefficient facilities, especially during roaming.

Another technical advantage of the invention is that distributed control intelligence may be used to authenticate, control, and monitor call and/or session traffic between network elements such as base stations, controllers, distributed switches, application software, and signaling systems. The invention may enable new IP protocols such as Session Initiation Protocol (SIP) to interact directly with a mobile device such as a handset for enhanced portability services where control and content are collapsed into a single packet-based stream. Network providers may be able to determine implicit or explicit routing, queries, and service requests from anywhere in the network using the advantages of the present invention. In effect, the invention provides the type, features, and performance of subscriber sessions between various media and network types to provide broadband multi-service networks in a wireless arena. The invention may enable new service creations such as content distribution, video, Wireless Access Protocol (WAP) and conferencing that may provide session control of any type of multimedia traffic in a typically stateless environment. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in conjunction with the accompanying drawings, wherein like reference numerals represent like parts, and in which.

DETAILED DESCRIPTION OF THE INVENTION

Figure 1:
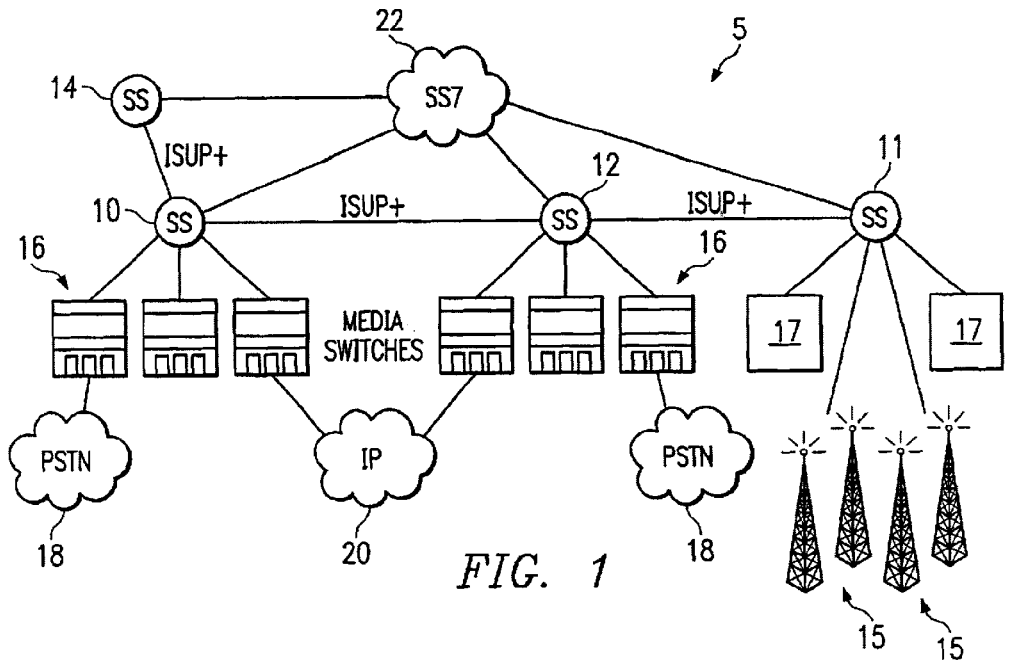
FIG. 1 is a block diagram of a network topology based on the softswitch of the present invention.

FIG. 1 is a block diagram of a network topology 5 based on the softswitch of the present invention. Network topology 5 includes several interconnected softswitches (SS) 10, 12 and 14, each of which interconnect several media switches 16. Network topology 5 also includes one or more softswitches 11 which couple to one or more wireless base stations or radio gateways 17 which include, but are not limited to, GSM, W-CDMA, W-TDMA, and GPRS technology. W-CDMA, W-TDMA, and GPRS and other gateways may then be coupled to 3G/GPRS base station radios. Softswitch 11 may also be coupled to one or more base station radio systems 15 which include, but are not limited to, AMPS, GSM, CDMA, and TDMA technologies. The communication between the softswitches may be through the use of ISUP+ (ISDN user part+), which is based on International Telecommunications Union (ITU) broadband ISDN user part (B-ISUP). Media switches 16 interconnect various network media, such as PSTN (public switched telephone network) 18, IP (Internet Protocol) 20, MGCP, and others thus enabling the transport of calls or sessions across different network domains. For example, a call may originate on PSTN 18 and be routed to a media switch 16 via the SS7 network.

Depending on the session transaction, features may be added to the call session, such as bandwidth allocation (compression) or security (encryption), or virtual private network (authentication). The softswitch of the present invention allows equalizing or normalizing signals from current wireline and wireless networks such as GSM, TDMA, and others. Such an advantage may eliminate a tiering effect by exchanging data between one or more protocols in IP rather than by intermachine trunking switching through a plurality of switches, or "dipping down" through a variety of circuits. The call or session may then be transported across another media network, such as an IP network, for completion on another media switch across town, across the country, or in another part of the world. The softswitch configuration controls the end-to-end transport of the call through integration of the network intelligence between the two media switches. The call session may then be converted back to a PSTN network for termination at a remote branch office. In this way, service portability is enabled. The services can be distributed to any device anywhere in the network over different media without the limitations of a CLASS-based network topology.

The softswitch of the present invention provides an integrated hardware and software solution set that provides the capability to receive signaling messages from any type of network and transmit the messages across a different network, while keeping the existing customer feature set. This solution bridges the gap between packet-based networks, traditional PSTN communications, and wireless networks to advance lower cost, and high revenue value-added services.

This solution set allows for the decoupling of service intelligence from transport equipment and unburdens the switch and router hardware of sophisticated call processing tasks, freeing them to concentrate on their main task—transmitting information across a network with minimal transmission delay.

Furthermore, the softswitch of the present invention allows the telecommunications companies, such as CLECs and LECs (competitive local exchange companies and local exchange companies), to use the cheaper Internet protocol/packet networks for transmission of their voice traffic while maintaining features and quality of service where applicable.

In the wireless arena, the softswitch may use multi-point wireless T1 radios from the traditional CDMA (code division multiple access) base station system (BSS) radio to the mobile-service switching center (MSC) or switching vehicle. The logic engine in a softswitch may provide a method to normalize a signal event into a specific protocol event from a variety of concurrent models such as GSM, TDMA, CDMA and AMPS systems. For example, the protocol used on the wireless T1 radios will be TCP/IP (transmission control protocol/internet protocol) with the wireless gateway located at the CDMA BSS radio facility. Additionally, the softswitch may build the switching vehicle (MSC replacement) in an LAN/WAN (local area network/wide area network) configuration. PSTN gateways will be located on the MSC LAN/WAN. The softswitch allows for a faster radio turn up, seamless hand over within one providers network as well as long distance call capabilities internal to the providers LAN/WAN network.

For example, codes in the softswitch may be used to convert signals from an air link or air interface, such as the Cellular Digital Path Data (CDPD) wireless packet data service provider's interface, for providing services over the airlink to mobile subscribers. The logic engine may make a channel available and handle the short pauses between the point in time at which a circuit-switched cellular telephone conversation and the time when another call ceases the same radio channel to place another call, or when a caller is "handed-off" from one cell to another as a caller travels through an area of coverage. The softswitch of the present invention is discussed in further detail in conjunction with FIGS. 2–15, and control and mobility management of wireless networks is discussed in further detail in conjunction with FIGS. 16–18.

Figure 2:
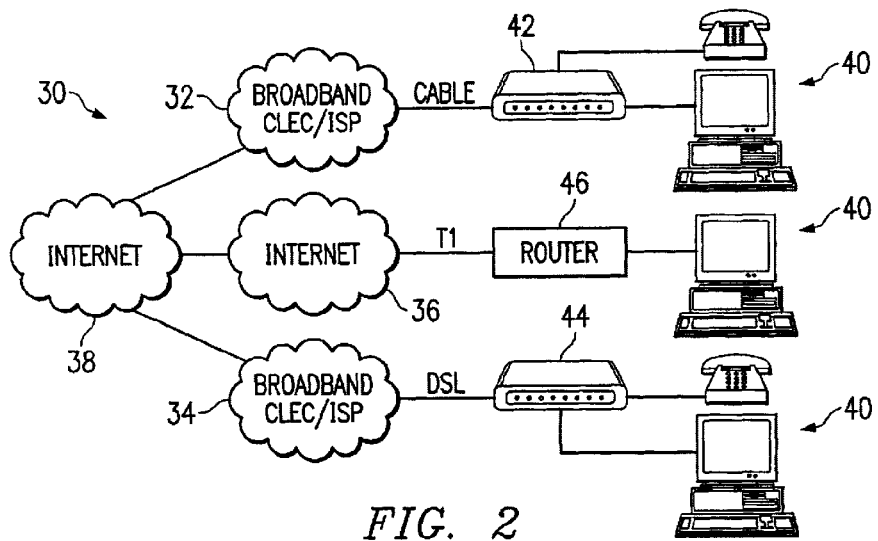
FIG. 2 is a block diagram illustrating the present Internet telephony network architecture.

FIG. 2 is a block diagram illustrating the present Internet telephony network architecture 30. In today's Internet telephony network 30, broadband Internet service providers 32 and 34, and Internet service providers (ISP) 36 installed high bandwidth access pipes from the Internet 38 to the users 40. Today's technology utilizes a number of different transport mechanisms to accomplish this link to the Internet, including cable modem 42, DSL modem 44, router 46, and dial-up access (not explicitly shown). These modems translate Internet traffic between the desktop (TCP/IP port) and the transport medium (cable, DSL, T1).

The telephony interfaces on the modems are supported by the ISP with interconnect to the PSTN. As a result, these ISPs are known as competitive local exchange carriers or CLECs. The only entity that can provide telephony services to users 40 are the ISP/CLEC provider that installed and own the modems. The users are charged separated for each provided service. For example, Internet TCP/IP access is charged separately from telephony services, which is also charged separately from cable video services.

The users in this scenario are also forced to make a technology decision for his telephony services. For example, if a user subscribes to a cable ISP, he cannot take his telephony service equipment and change over to a DSL ISP provider. The current technology does not provide the user to have geographic portability or fully take advantage of the flexibility of the Internet.

Figure 3:
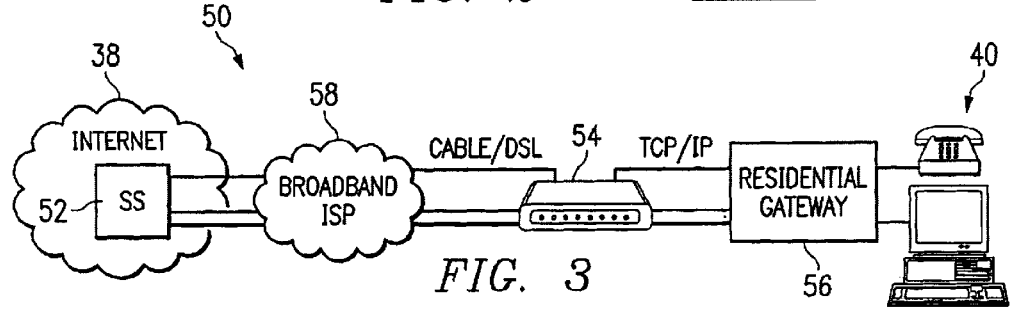
FIG. 3 is a block diagram of the Internet telephony network architecture using the softswitch of the present invention.

FIG. 3 is a block diagram of the Internet telephony network architecture using an Internet-based softswitch 52 of the present invention. Softswitch 52 functions as an Internet central office that provide traditional central office functions and capabilities to the Internet user community. Therefore, any IP-enabled user 40 has access to telephony services, without regard to the underlying transport technology. Users 40 are coupled to the Internet central office via a residential service gateway 56. Residential service gateway 56 provides proxy server, TCP/IP hub, firewall, residential gateway, and residential service client software functionality. The proxy server function allows the user to only require one IP address from the ISP for multiple devices and improves performance for a group of users. The TCP/IP hub function allows for connectivity from one to multiple TCP/IP devices. The firewall function protects the customer devices from fraudulent access originating in the Internet. The residential gateway functions convert the analog telephony services from the user into TCP/IP for transport through the Internet. Additionally, the Internet central office is operable to control and communicate with residential service gateway client software 56 for call state control. The residential service client software is a companion client application to the Internet central office. This client allows the user (telephony subscriber) to solicit or initiate service from the Internet central office. This client provides a secure, encrypted dialog between the Internet central office and the user's client for call control (registration, addressing and supervision). Another feature of the residential service client software is that user's service profiles may be uploaded or downloaded to a database in the residential service gateway through a local area network (LAN), serial port, smart card, or an infra-red interface into a third party application and device. This functionality allows the user to be fully mobile by connecting to any residential service gateway, download their profile into the residential service gateway, and personalize it.

Residential service gateway 56 may be a stand-alone hardware/software combination equipment or be in the form of a software application running on a user's personal computer. As a software application, it has the added advantage of being downloadable and run locally on the user's computers.

The Internet central office implemented with softswitch 52 allows the establishment of CLECs on the Internet. Users who own residential service gateway equipment or software can subscribe to telephony services directly from the Internet central office-enabled CLEC. The customer's ISP transports this service as though it were normal IP traffic. The Internet central office and residential service gateway interoperate at the IP level and are therefore compatible with any IP transport medium. The Internet central office can switch telephony traffic from one Internet-based residential service gateway to another, or connect calls between the PSTN and an Internet-based residential service gateway customer. A subscriber may relocate his/her residential service gateway, or transfer his/her profile to another geographical location, and his/her telephone number and services will follow to any location in the world without the need for traditional number portability systems. Internet central office service is completely (carrier, service, and geographic) portable.

Upon initialization, residential service gateway 56 is assigned an IP address from the ISP. Residential service gateway 56 then automatically locates the Internet central office on the Internet. Residential service gateway 56 then registers with an existing account or is directed to an automated provisioning system to establish new services. New service provisioning may allow the user to port his/her existing telephone number, or select an area code for a serving city where he/she desires service to be established.

Station identifiers or telephone numbers are a function of the Internet central office's point of presence. For example, if an Internet central office were interconnected to city A PSTN, it may offer city A telephone numbers to its subscribers regardless of the geographical location of the customer's residential service gateway. Calls that originate and terminate to and from Internet central offices can be considered within the network and thus know no limit to the calling area. Such a configuration would motivate flat rate pricing.

It may be seen that the residential service gateway includes network registration, call control/supervision, subscriber services, client security, and user profile database functionalities.

Internet central office providers may negotiate first tier interconnect agreements with the broadband ISPs to provide a higher quality of service. An Internet central office may also interconnect to another Internet central office using a managed IP network to maintain a high quality of service.

Therefore, by adopting the network topology shown in FIG. 3, a number of advantages are obtained. The Internet telephony market is opened to competition and allows for cost reduction of telephony services. The Internet central office and residential service gateway interoperate using any broadband Internet technology so that service is portable from one transport to another. The user's telephone service becomes geographically and service portable to any location. The Internet central office allows existing CLECs to extend the reach of their telephony network into the broadband user's premise without investment in broadband technology. This technology also eliminates the need for unbundling the broadband ISP to telephony carriers. Flat rate calling service plans become available for calls that stay within the Internet central office network. Furthermore, the Internet graphical user interfaces can be leveraged to automatically provision services.

Figure 4:
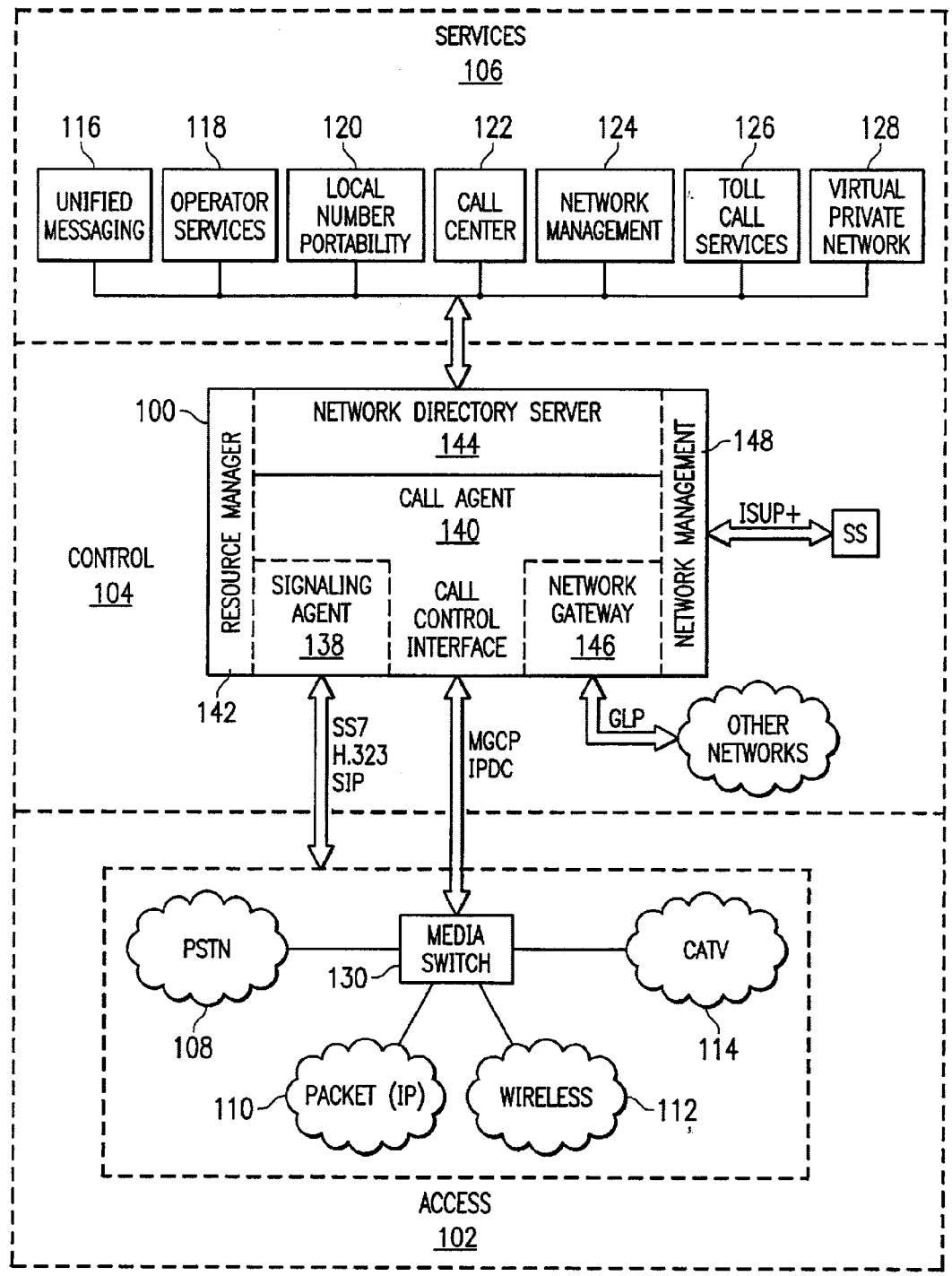
FIG. 4 is a simplified top-level block diagram of an embodiment of the softswitch constructed according to the teaching of the present invention.

FIG. 4 is a simplified top-level block diagram of an embodiment of the softswitch 100 constructed according to the teaching of the present invention. Softswitch 100 is based on the session layer of the OSI model. The session layer is where the network intelligence resides, not at the transport or application layers. The network structure for telecommunications is evolving to have three distinct functional layers: access 102, control 104, and services 106. Access layer 102 is responsible for media transport of calls and sessions, and includes PSTN, packet (IP) network 110, wireless 112, CATV (community antenna television) 114, etc. Control layer 104 is responsible for controlling the elements of the access level and operating in concert with the service level as calls or sessions require interaction with services available in the network. Services layer 106 is responsible for defining the services through databases and service logic. Examples of services are unified messaging 116, operator services 118, local number portability 120, call center 122, network management 124, toll call services 126, virtual private network (VPN) 128, specialized routing (time-of-day, calling party area, etc.), unified messaging, etc. It may be seen that softswitch 100 resides in control layer 104.

Softswitch 100 is preferably built on open protocols to set-up and control media sessions, i.e. any combination of voice, data and video flows. Some open protocols used by the media switches 130 are IPDC (IP device control protocol), MGCP (media gateway control protocol), and SGCP (simple gateway control protocol). Softswitch 100 includes six main functional components: signaling agent 138, call agent 140, resource manager 142, network directory server 144, network gateway 146, and network management 148.

Figure 5:
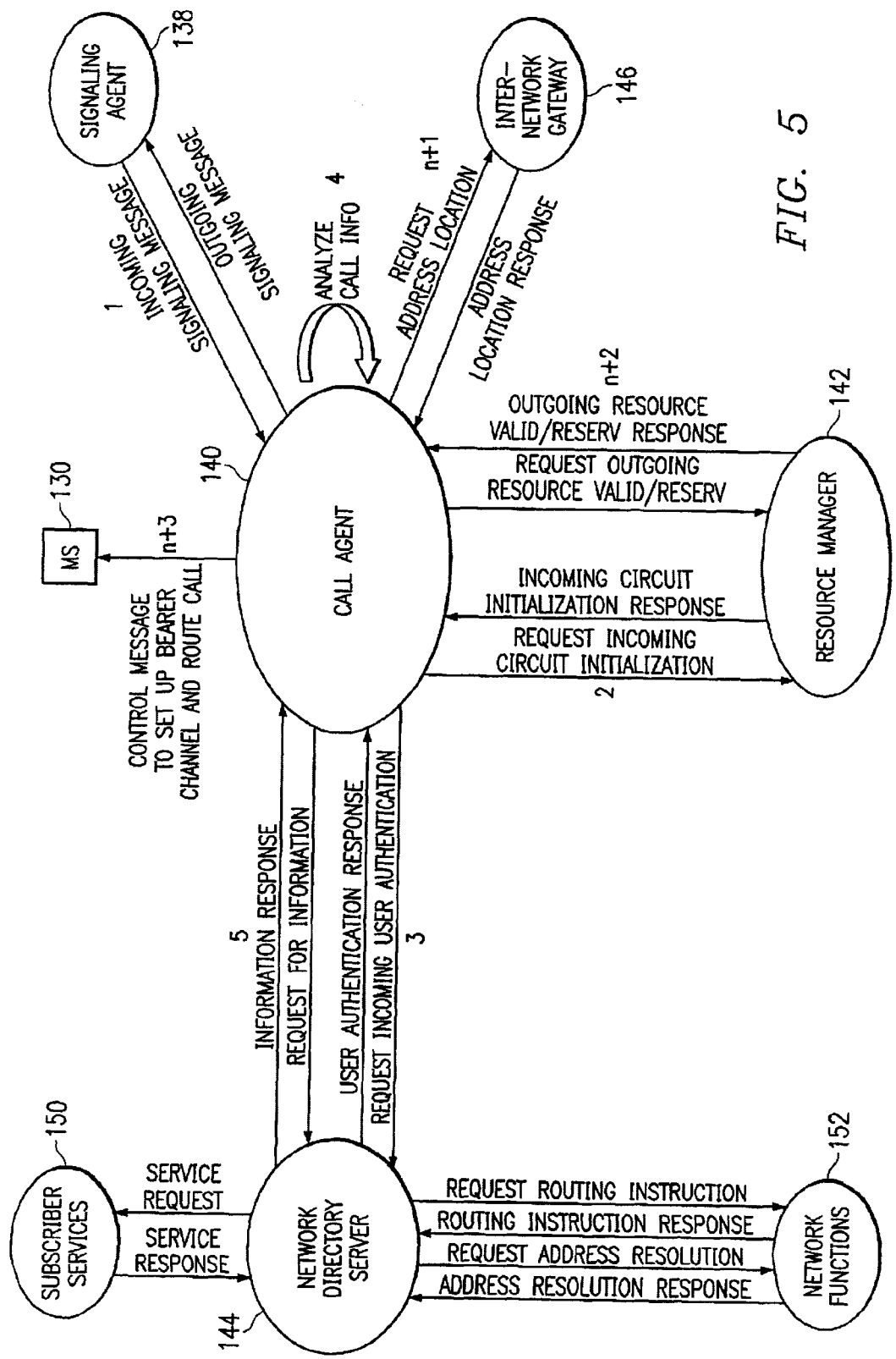
FIG. 5 is a more detailed block diagram of an embodiment of the softswitch constructed according to the teaching of the present invention.

With reference to FIG. 5, signaling agent 138 communicates with call agent 140 and access network 102, such as media switch 130, SS7 network, and SIP (session initiation protocol) end users. Signaling agent 138 translates incoming signaling messages to the appropriate call model event to be sent to call agent 140. The role of signaling agent 138 is to receive any type of access protocol, communicate with call agent 140, and to terminate the call to the appropriate network using the applicable protocol as instructed by call agent 140. For example, signaling agent 138 may receive an SS7 IAM and be able to terminate the call to an IP network user. To call agent 140, events from signaling agent 138 appear as if it is just another client/server that is capable of originating and terminating sessions.

Signaling agent 138 is operable to support standard MTP and physical level interfaces as required by the networks. The processing of the SS7/C7 interfaces are handled within signaling agent 138. The session or call processing protocol on signaling agent 138 is session initiation protocol (SIP). By utilizing a native packet-switch control protocol out of the edge element, signaling agent 138 are able to represent the control of the media switch packet capabilities in native form. Thus, capabilities and interaction of call agent 140 and signaling agent 138 are not constrained to a legacy interface as the packet-switched network and services continue to evolve. A number of existing IP telephony products are controlled or interoperate with the H.323 protocol. The softswitch provides interoperability between H.323 and SIP. H.323 can remain configured in access networks, grouping together several devices into domains. The softswitch adds the extensibility found in SIP protocols to provide simplified interaction with the call session engine, which in turn interacts with the policy/directory server and feature application servers. In this way, investments in H.323 are protected without compromising future development brought about by new service applications. Multi-network datagram transmission protocol (MDTP) is an application level protocol designed to provide a fault-tolerant, real-time reliable data transfer between endpoints communicating over an IP network. It is used to provide call control and signaling for Internet telephony. It is scalable to support different signaling transport requirements based on the different interfaces to the telephony network.

Call agent 140 is responsible for managing the end-to-end control of the sessions or calls between packet-switched elements. As a central element in the architecture, call agent 140 is a focal point of access to intelligent services as required by the sessions under its control. Billing data consolidation of services provided and entities involved in the call will be performed in call agent 140. Interworking and translation for the SS7/C7 events to SIP and the implemented gateway control protocol will be performed with the relevant state data maintained in call agent 140. The media switch chosen for any particular implementation of the softswitch is dependent upon the transport requirements of the service provider's network. The control of the media switch has the following minimum criteria for interworking with the softswitch: open gateway control protocol of MGCP, registration of configured ports through the gateway control protocol, SNMP (simple network management protocol) trap support, web-based configuration mechanism, minimum of E1/T1 support on circuit-switched connectivity. The above attributes allows signaling agent 138 the capability to manage the circuit-switched ports on one or more media switches. The limit of the ports managed will depend on the density of ports in each media switch and the hardware configuration of the signaling agent. The packetswitched interface of the media switch is directed by the gateway control protocol. This control allows the RTP or other streams to be connected between the media gateway and the other media devices as directed by the signaling agent.

The IP device control (IPDC) protocol is used between the media gateway controller call agent 140 and the media gateway. It is used to provide connection control, media control, and signaling transport. In order to support different service provider media gateways, the softswitch supports MGCP and IPDC to communicate and control the media gateway.

Call agent 140 provides the raw data to the service providers down stream billing systems for call detail records (CDR), and other billing functions. The raw data can be customized per interface.

The main responsibility of resource manager 142 is to validate the incoming circuit, and to provide resource availability information for the outgoing call from the media switch. Resource manager 142 is responsible for maintaining circuit state and relative information, for all circuit-switched entities on the media switches. In addition, resource manager 142 is responsible for managing virtual ports (DSP, echo cancellers) on the media switch, depending on the media switch implementation. Also, resource manager 142 is operable to determine aggregated bandwidth allocation on the media switch.

Network directory server 144 is responsible for managing user profiles, such as access authorization, call barring, dial plan, etc. and providing routing instruction for local and external (local number portability, 1-800) calls. Network directory server 144 is also operable to provide address resolution and translation, and accessing subscriber services (special tones and treatments) by sending requests to network functions element 152 and subscriber services element 150. Network directory server 144 also handles scripts by accepting, acting, and distribution to correct destinations. Network directory server 144 is accessed by call agent 140 to receive routing instructions. Network directory server 144 may reside on the same platform as call agent 140 or may be distributed. Network directory server 144 may also provide enhanced routing function, such as time-of-day routing, percent allocation routing, dial plan, route choice, etc.

Network gateway 146 is responsible for interconnecting the softswitch network to an external network. Call agent 140 accesses network gateway 146 to determine a location of a user and he/her privileges in order to route the call to the external network. For example, if a user is not within the softswitch domain, call agent 140 is prompted by network directory servers 144 to request instructions from network gateway 146. At this point, call agent 140 requests instructions on where to route the call, different rate structures associated with the call, and determine if the external network is willing to accept the call. If all conditions are satisfied the external network gateway will provide network gateway 146 with routing instructions.

Network management 148 is responsible for provisioning, monitoring, alarm generation, performance and trouble shooting management, reporting, system maintenance and administration, configuration management. The various control elements reside in an IP network. They utilize SNMP and remote monitoring (RMON) agents to collect, store, trap, and monitor data/trends on network utilization, performance, availability, etc. This information is combined with configuration attributes from each device into a user-friendly, browser-enabled network management interface, using HTML. In this way, users have control, administrative, and monitoring capability from anywhere in the network. This format allows for integration with other web-enabled network management systems and provides the ability to push service administration to customers without compromising operational integrity of the production network.

Figure 6:
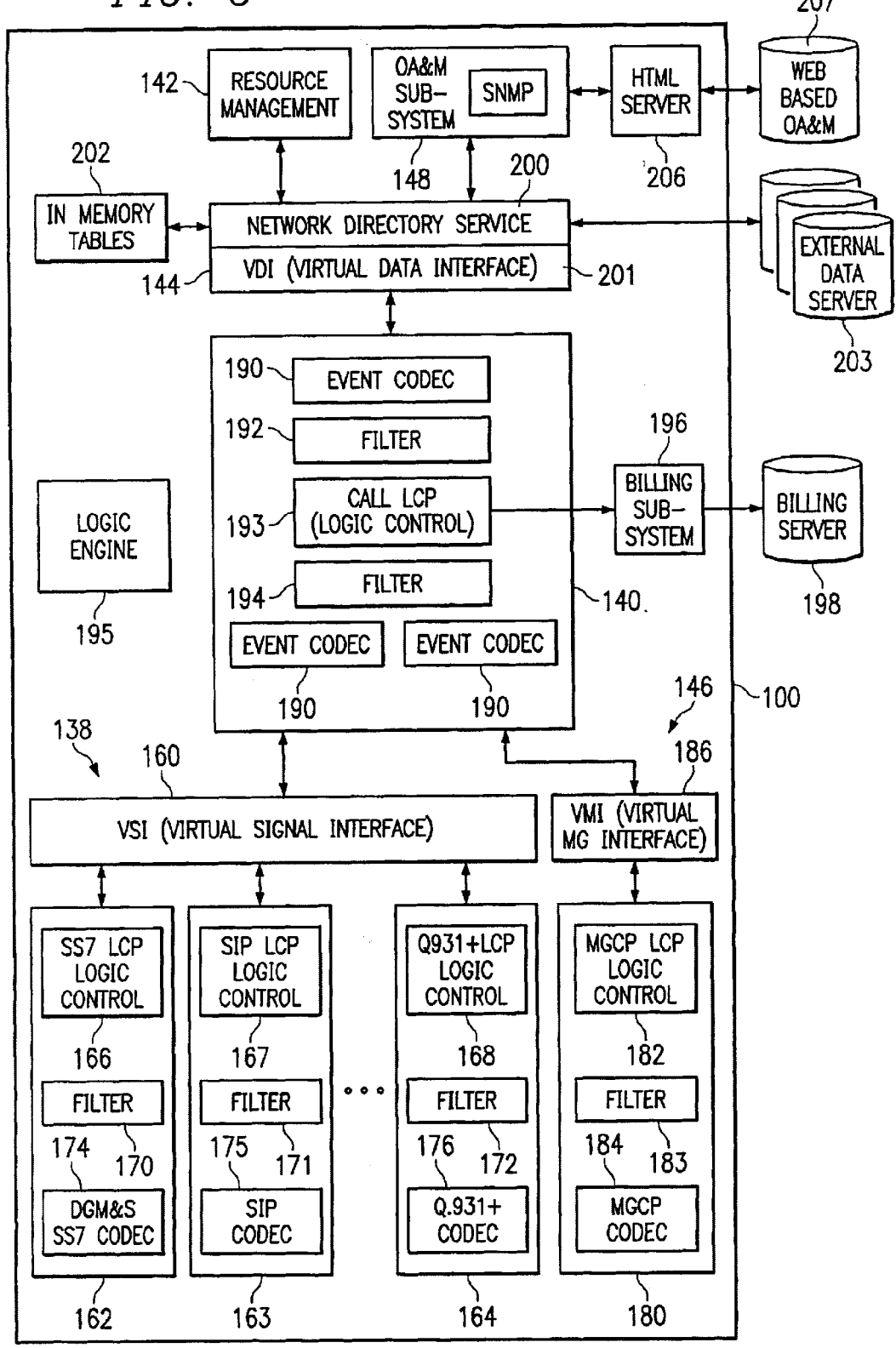
FIG. 6 is a simplified internal call flow diagram of an embodiment of the softswitch constructed according to the teaching of the present invention.

FIG. 6 is a more detailed block diagram of an embodiment of the softswitch 100 constructed according to the teaching of the present invention. Signaling agent 138 of softswitch 100 includes a virtual signal interface (VSI) 160, which provides an interface to call agent 140. Signaling agent 138 includes a number of signaling agents 162–164 operable to interface with SS7 interface, SIP devices or interface, H.323 devices or interface, Q.931 interfaces and devices, and others. Each signaling agent includes a respective logic control 166–168 executing logic control program, filter processor 170–172, and codecs (coders/decoders) 174–176. Codecs are specialized communication modules. Network gateway 146 includes gateway agents 180 for interfacing with MGCP media gateway switch, IPDC media gateway switch, etc. Each gateway agent 180 each also includes a logic control 182 executing a logic control program, a filter processor 183, and a codec 184. Network gateway 146 further includes a virtual media gateway interface (VMI) 186 for interfacing with call agent 140.

Call agent 140 includes event codecs 190 for interfacing with network directory server 144, signaling agent 138, and network gateway 146. Call agent further includes a logic control 193 executing call logic control programs, and filters 192 and 194. Logic controls 166–168 and 182 and call logic control 193 make up logic engine 195. Logic engine 195 is a protocol-independent, data-configurable, multi-threaded state machine processor. The details of logic engine 195 are set forth below with reference to FIGS. 14 and 15. Call agent 140 also communicates with a billing sub-system 196, which stores CDRs and other billing information in a billing server 198. Network directory server 144 includes a network directory service 200 and a virtual data interface (VDI) 201. Virtual data interface 201 interfaces with call agent 140. Network directory service 200 accesses in-memory tables 202, which store user profiles, routing instructions, addresses, and subscriber services. Network directory service 200 further accesses external data servers 203. Network directory service 200 also communicates with resource manager 142 and network management 148. Network management 148 includes OA&M (operations, administration and maintenance) sub-system, which communicates with an HTML server 206 and a web-based OA&M database 207.

It may be seen that call agent 140 interfaces with virtual signal interface 160, virtual media gateway interface 186, and virtual data interface 201. Signaling events are received through VSI 160 and the specific protocol events are normalized. The key to routing messages between logic control programs is the message type (call set up, disconnect, etc.) and subsystem type (SS7, SIP). The normalized signaling event is sent to call agent 140 for processing. Assuming proper message formatting, a route is selected, the media gateway agent is contacted, the call is terminated through the media gateway agent and the call control processing is complete until one of the calling parties terminates the call. During the course of processing the event the message goes through the following stages:

1. A normalized message is received from the VSI.
2. The data contained in the message goes through basic validation to confirm that the contents have not been modified or lost. The call is abandoned if the data is invalid.
3. The inbound circuit is queried, through the VDI, to confirm the call is being processed from a circuit in a valid state. This is to prevent processing a call from a circuit that has been administratively locked or through fault management that has been disabled.
4. Query the VDI to select a route for the call based on the called number, which may be a SS7 circuit or an IP address for SIP.
5. For a successful route, contact the media gateway agent and open a session. Send a CallSetup message to the VSI. If the route failed, play an announcement and abandon the call.
6. Upon receipt of the alert message from the VSI, the media gateway agent is updated to add the termination leg to the existing call session. The alert message is sent to the VSI.
7. Upon receipt of the answer message from the VSI, the media gateway agent is updated to cut the voice path between the originator and the terminator for the existing call session. The answer message is sent to the VSI. The call is now setup and waiting for one of the calling parties to disconnect.
8. Received a message that one of the calling parties disconnected. Tell the VDI to release the resource, cut a billing record.
9. When all the calling parties have disconnected, a final billing record is cut. The call model logic control program exits.

Figure 7:
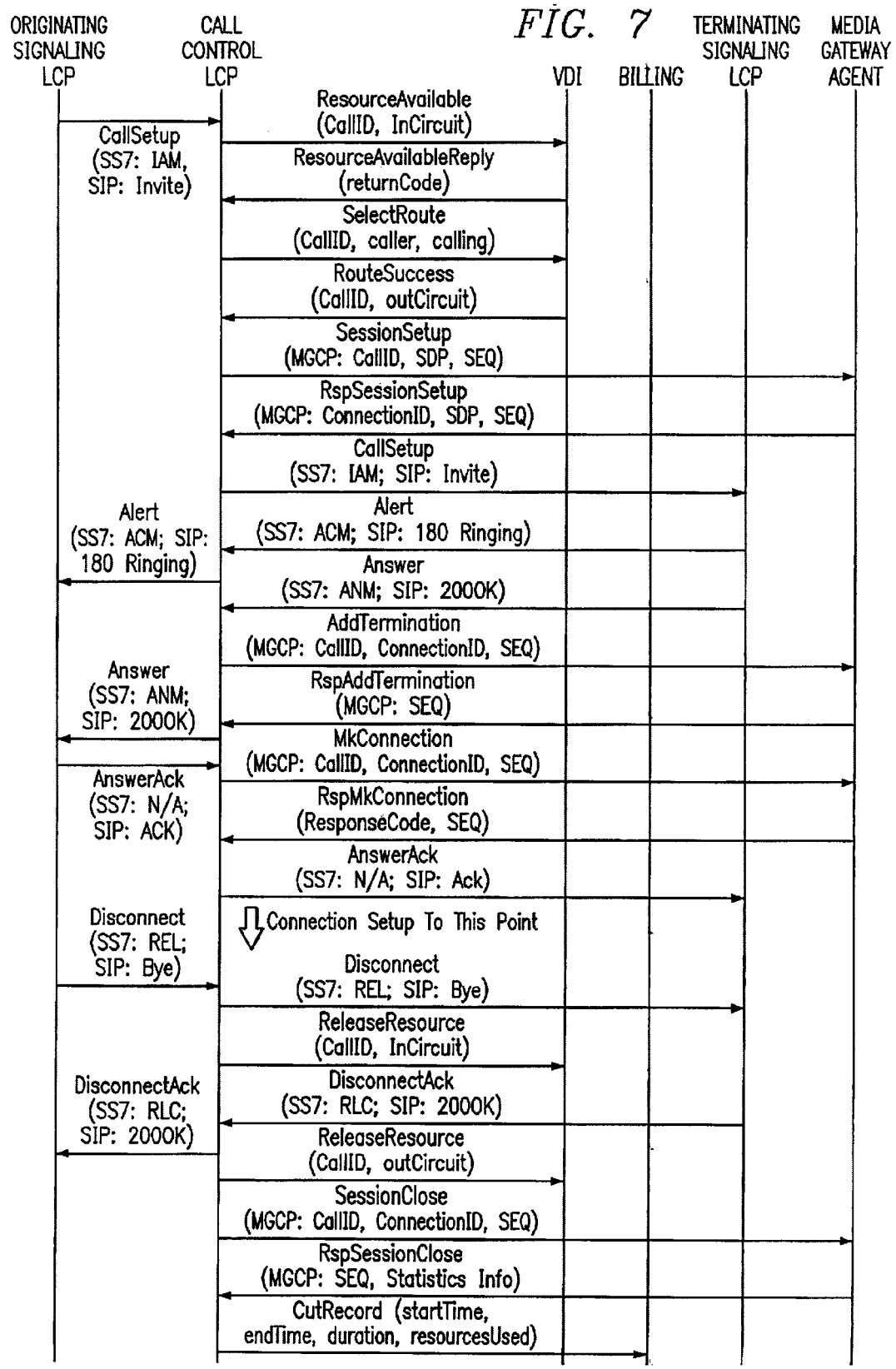
FIGS. 7–13 are call flow diagrams illustrating the operations of the call logic control subsystem of the present invention.
Figure 8:
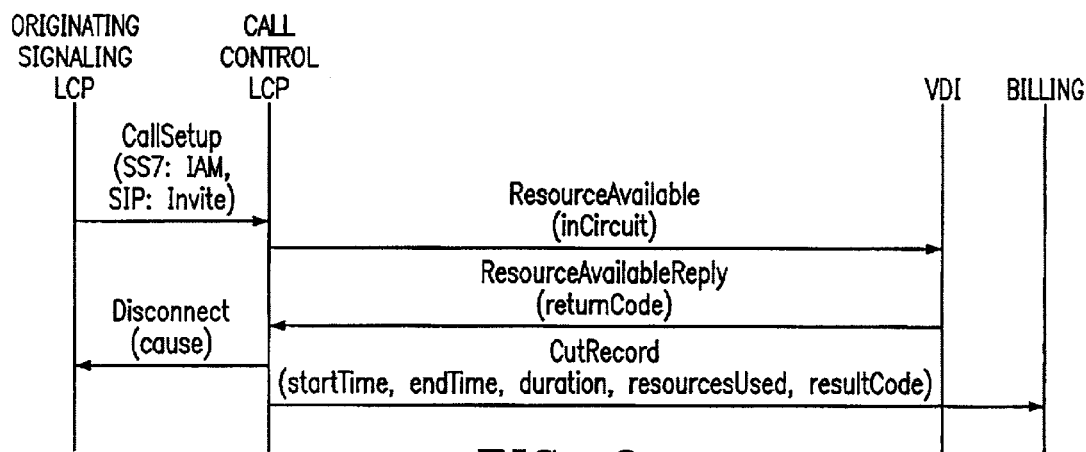
Figure 9:
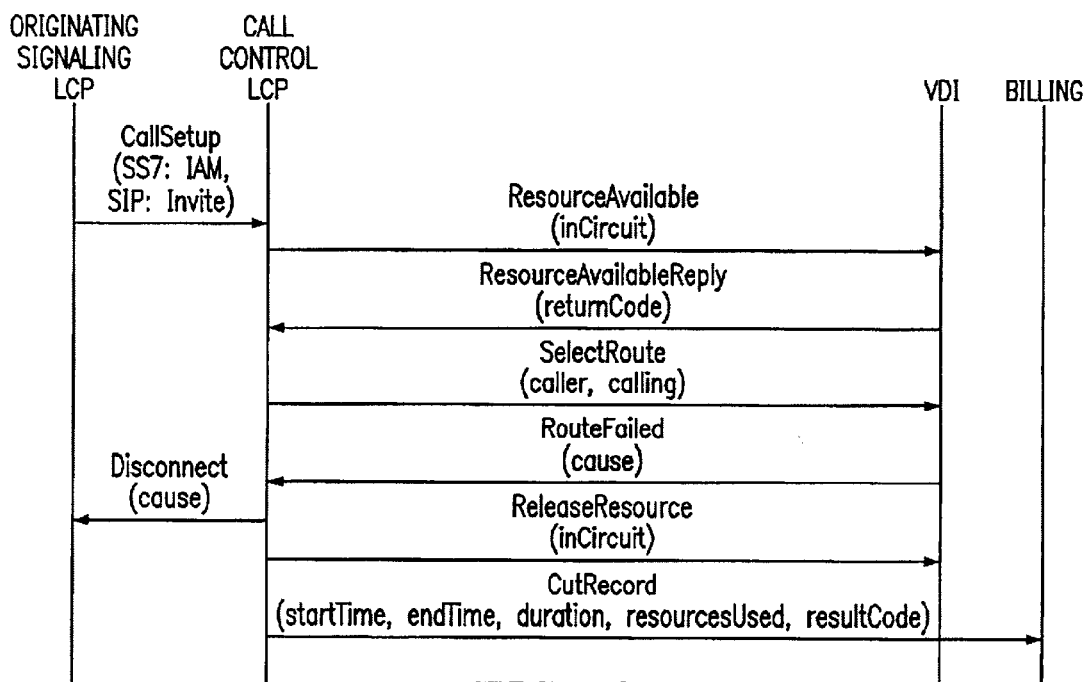
Figure 10:
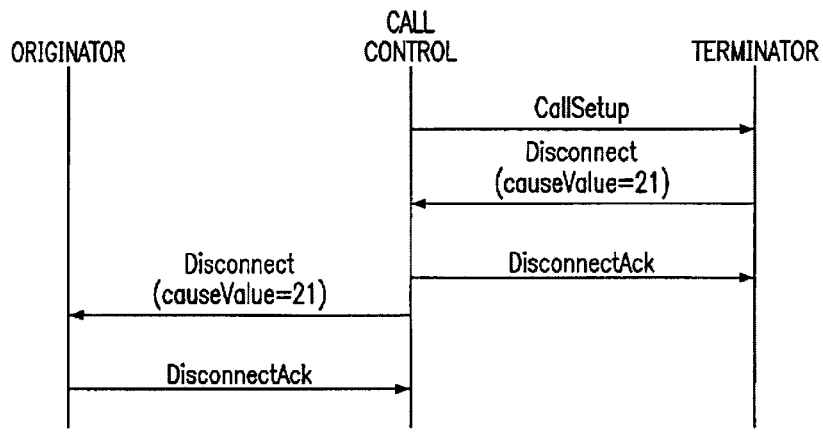
Figure 11:
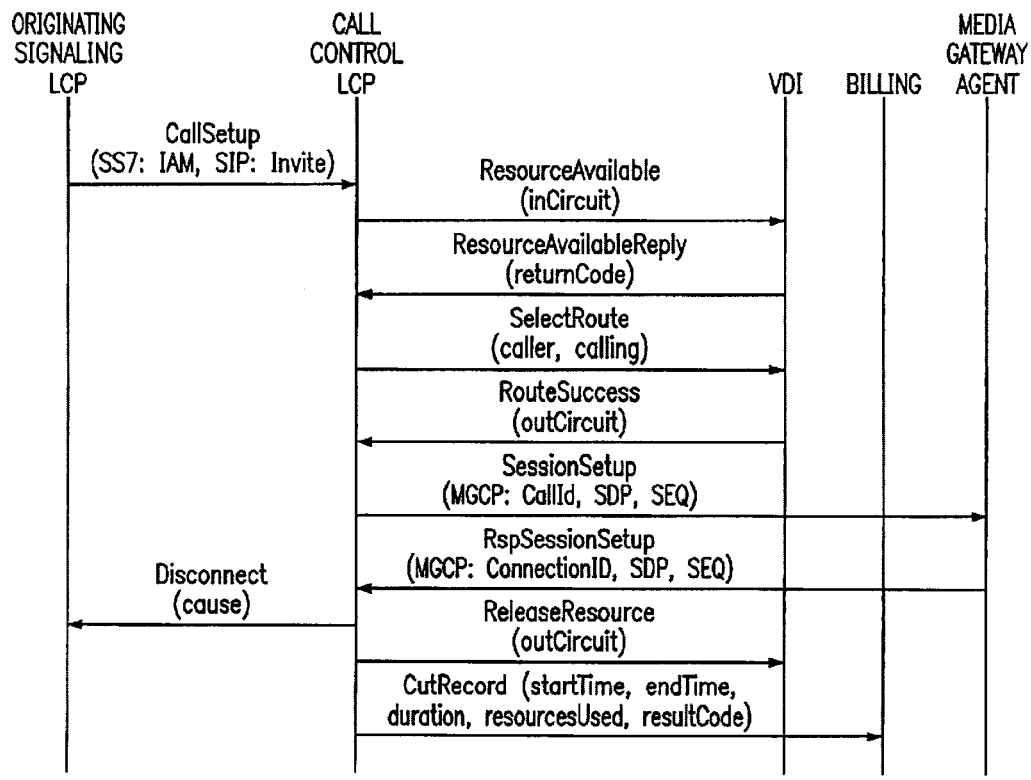
Figure 12:
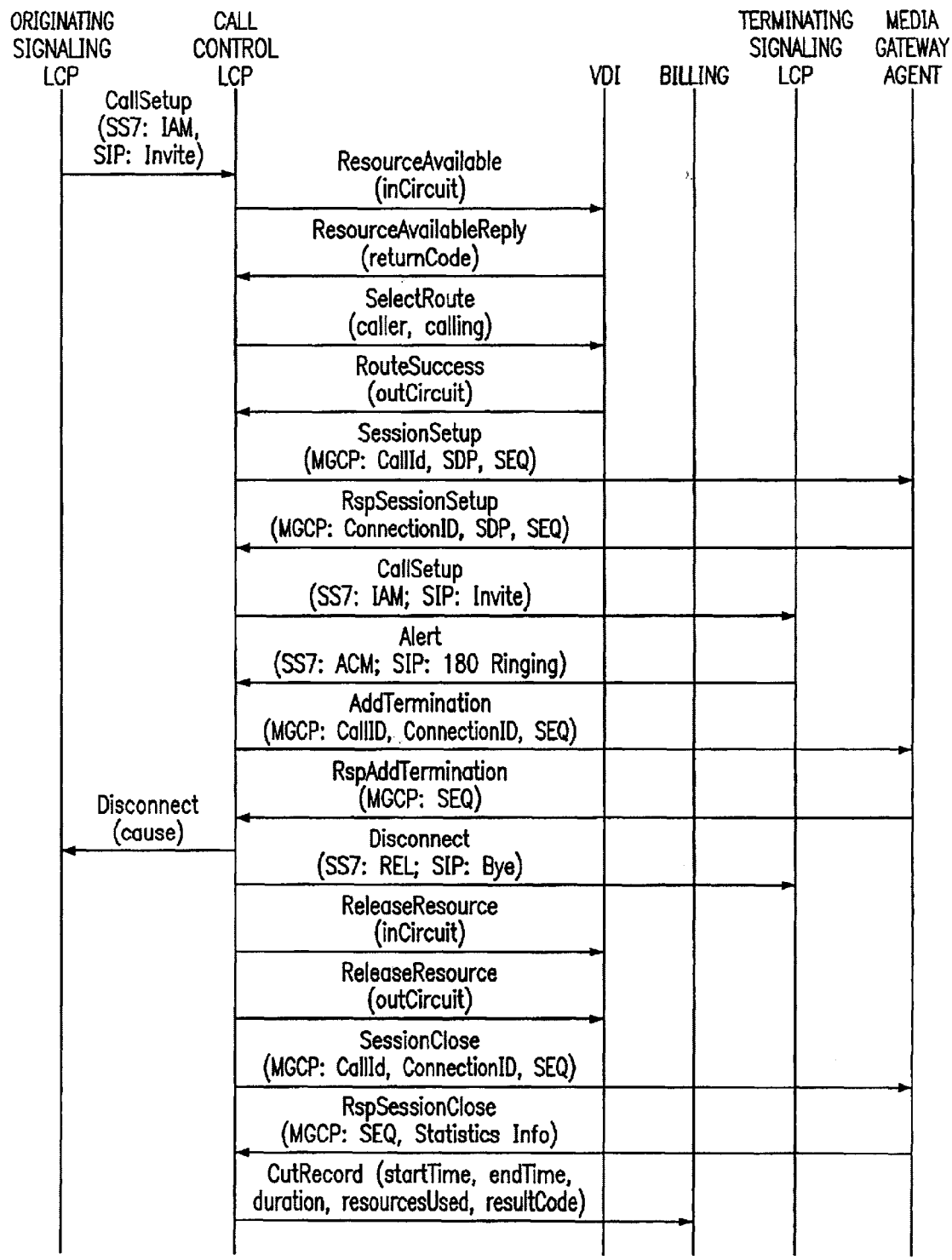
Figure 13:
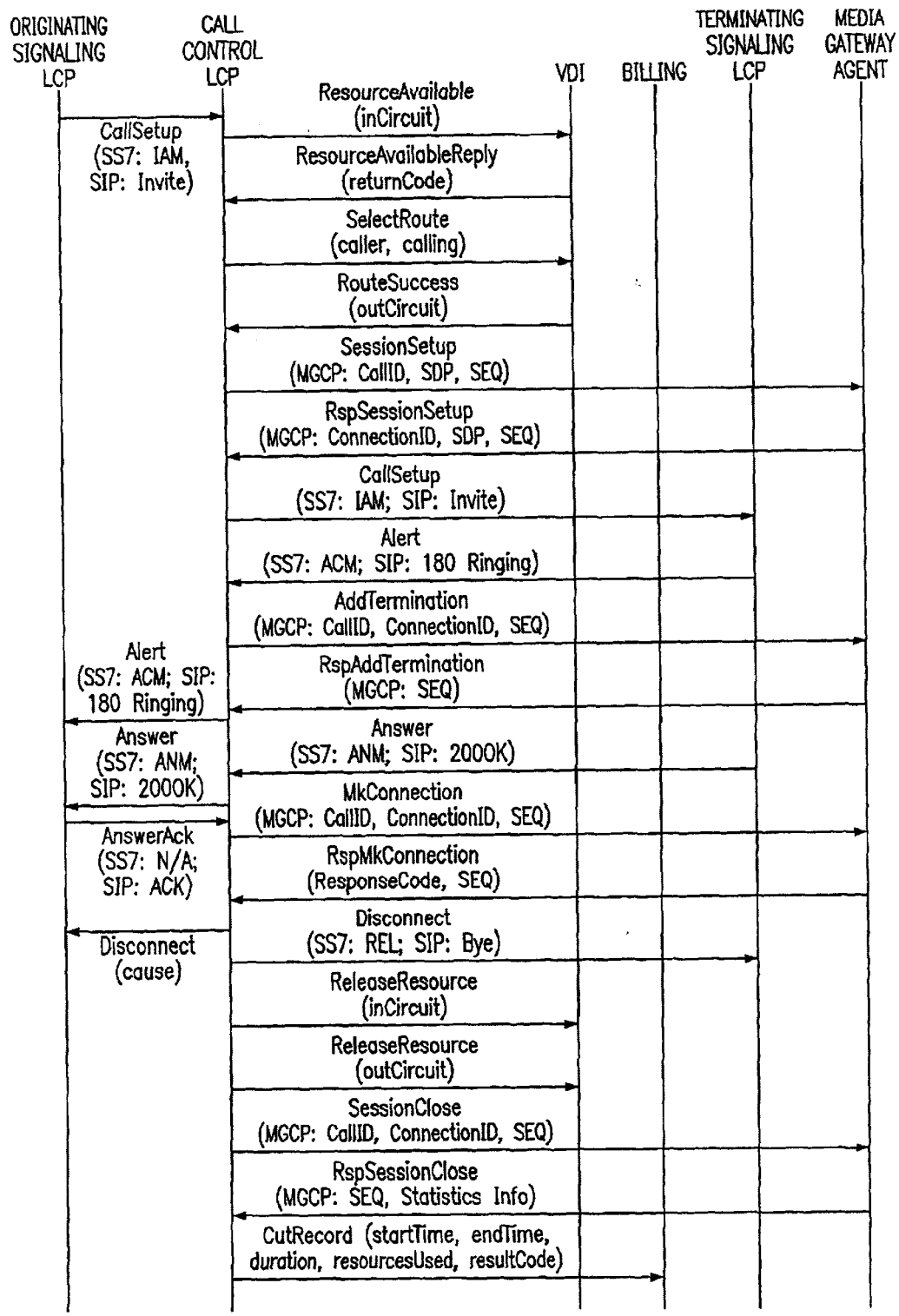

FIGS. 7–13 are exemplary detailed call flow diagrams illustrating the call logic control subsystem of the present invention. FIG. 7 is a call flow diagram of a normal call processing. FIG. 8 shows the call flow in which the in bound resource/circuit is in an invalid state to process the call. The call VSI is notified that the call has been abandoned. A billing record is produced to indicate that an error occurred. FIG. 9 is a call flow diagram of a route request that failed. The failure cause code returned from the VDI is mapped to a normalized cause code that VSI and call control agree upon. FIG. 10 is a call flow diagram illustrating the call flow in which the terminating side is busy. FIG. 11 is a call flow diagram showing the media gateway agent returning a failure code for the session setup request. An announcement is played to the caller and the call is abandoned. FIG. 12 is a call flow diagram showing the media gateway returning a failure code for the add termination request. An announcement is played to the caller and the call is abandoned. FIG. 13 is a call flow diagram showing the media gateway returning a failure code for the make connection request. The originator and terminator are played an announcement and the call is abandoned.

Figure 14:
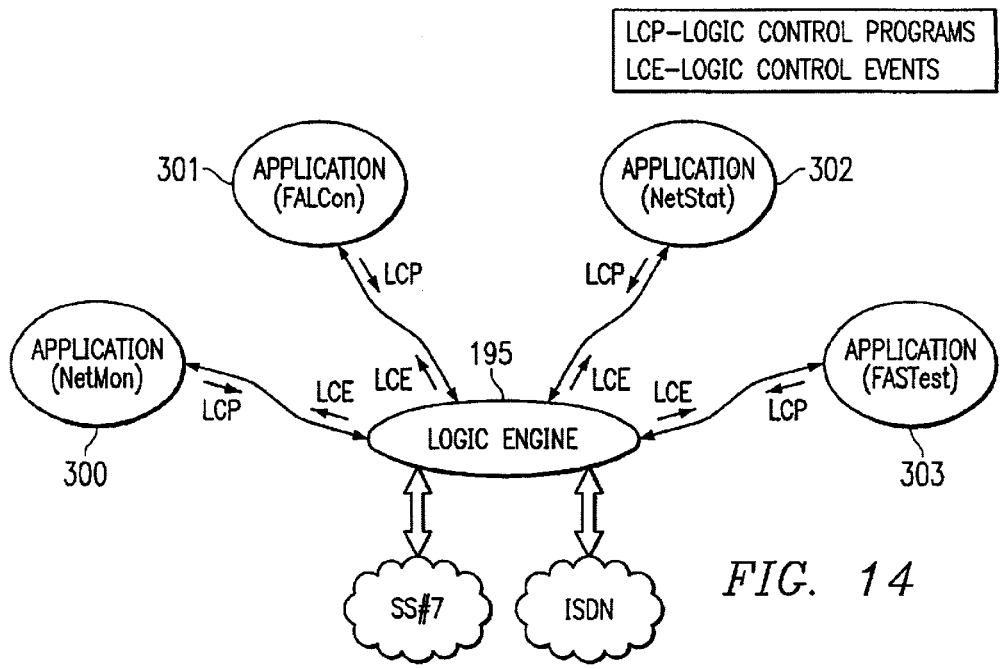
FIG. 14 is a logic diagram of the operations of a protocol-independent logic engine for processing call events.

FIG. 14 is a logic diagram of logic engine 195 according to the teachings of the present invention. Logic engine 195 is operable to allow applications 300–303 to download and retrieve the status of logic control programs. Logic engine 195 is a configurable state machine processor that is responsible for carrying out the logic control program. This includes sending and receiving messages on the appropriate communication links, generating events for the application, maintaining operating statistics on each logic control program, and communicating with other logic engines. Logic engine 195 is operable to communicate with many specialized communicator modules or codecs (162–164, 180). These codecs are responsible for handling the formatting and parsing of the messages for the protocol each specializes as well as dealing with the transmission to and reception of the messages from the outside world. Furthermore, a maverick codec may be employed which is responsible for performing tasks not associated with a standard protocol, such as billing, statistics, or provisioning. Each logic engine component (logic controls, codec, filters) is running in a separate thread. It is therefore possible to configure what threads are in the logic engine at run time so that functionality in the form of different codecs can be easily added.

Logic engine applications 300–303 are external processes that communicate with logic engine 195. Since a logic engine 195 has no built in algorithms for performing any specific process, it is applications 300–303 that supply application-specific functionality. The applications may establish and maintain a TCP/IP socket connection with the logic engine, generate appropriate logic control programs and downloading them to the logic engines, and monitoring event and statistic data.

Figure 15:
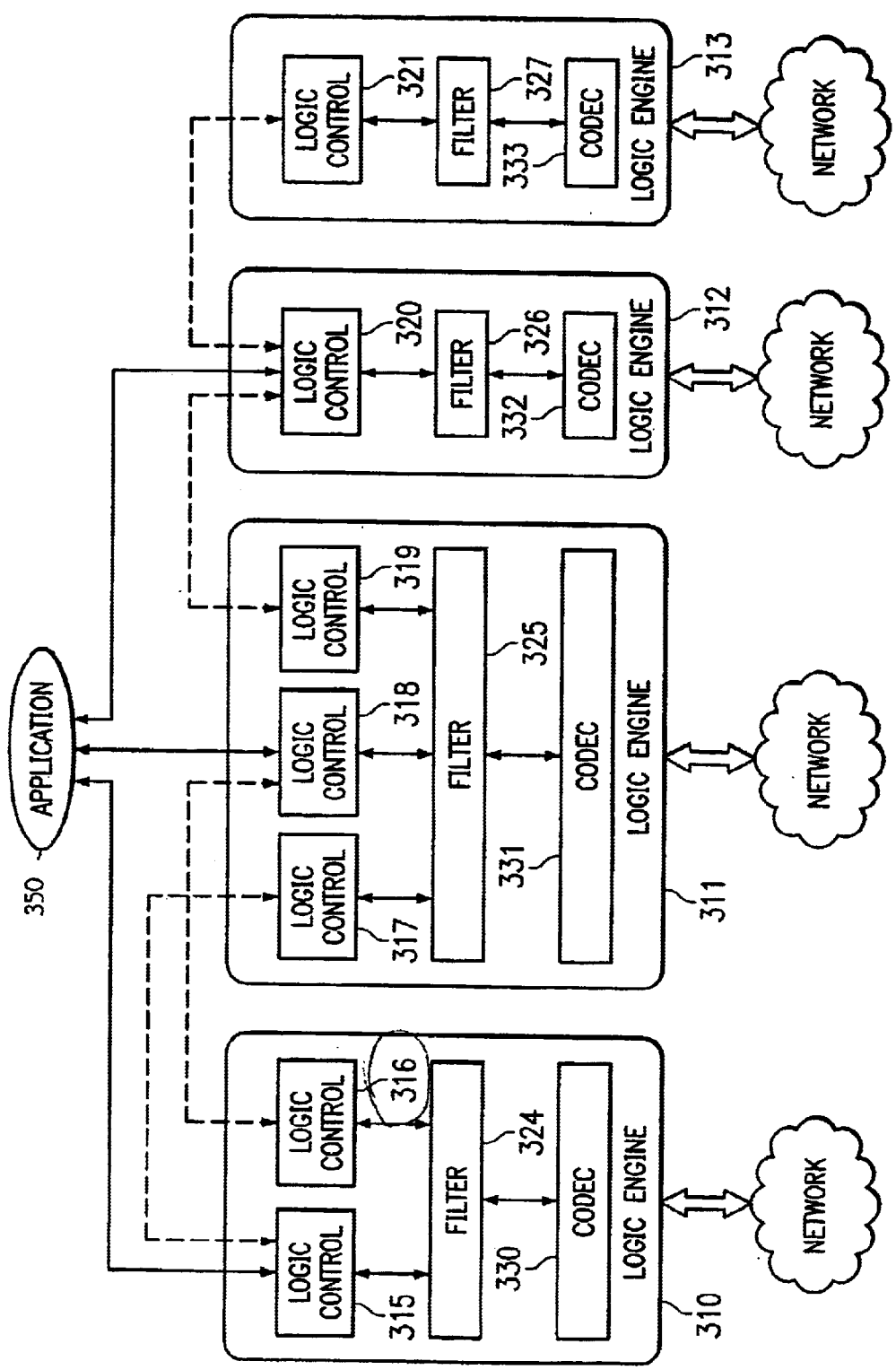
FIG. 15 is a more detailed logic diagram of the operations of the protocol-independent logic engine for processing call events.

Referring to FIG. 15, a block diagram of the basic architecture of a network of logic engines 310–313 is shown. It may be seen that one single application 350 can communicate with one or more logic engines 310–316 and the logic engines themselves can be grouped in a hierarchy. When the logic engines are grouped in a hierarchy, it uses pass-through logic controls to pass messages that are intended to one logic engine from another logic engine.

Logic controls 315–321 are the data-configurable generic state machine processors that execute logic control programs. A logic control program defines how the logic engine is to operate. A logic control program contains actions (i.e. send an event to the application, transmit a message, etc.), transitions (which define what to do given a certain external event, i.e. message received, timer timed out, etc.), and data (i.e. lists of phone numbers or circuits, application identification on connection, timer values, etc.). A logic control program is a series of data items or independent building blocks that define what a logic engine application is to perform, such as message definition, data items, when to send a message, etc. Logic engines 310–313 also includes filters 324–327 that filter and route messages that originate from codecs 330–333 destined for logic controls 315–321. The logic engine can be distributed over many links, in multiple locations, to accomplish the tasks needed for a given application. In this manner distributed links can be monitored for one (or more) application, without the application needing to distribute itself over the links.

After an application is, initiated and connecting to the logic engine, the application identifies itself by sending an application item to the logic engine. The application item identifies the application and specifies how to handle any downloaded data in the event the application disconnects. The application item may be the only item in the packet sent to the logic engine. The logic engine then checks to determine whether the application is allowed to download data to the logic engine. This requires that the application's identifier in the application item is not currently in use and is valid.

The application downloads a logic control program or multiple logic control programs to the logic engine to accomplish its desired tasks. The download process occurs after the application has established a socket connection with the logic engine. The logic control program data are preferably sent to the logic engine in the following order so ID references can be resolved properly:

1. Network Item(s)
2. Debug Item(s)
3. Match Item(s)
4. Column Item(s)
5. Counter Item(s)
6. Timer Item(s)
7. Load Item(s)
8. Key Item(s)
9. Event Data Item(s)
10. Event Item(s)
11. Message Item(s)
12. Action Item(s)
13. Transition Item(s)
14. Logic Item(s)
15. Logic Control Program Item(s)
16. Download Complete Control Item All items in the download list are optional. If an application has already downloaded a complete set of logic control program data, only new or changed items need to be re-downloaded to the logic engine. If a logic control program does not use a certain item type, such as a column or counter, the downloaded data does not need to include any item of that type.

Control commands are used to instruct the logic engine what to do with the downloaded data. These commands will only make sense to the logic engine if all the logic control program data has been downloaded by the application. The start command is used to instruct the logic engine to start executing a given logic control program according to the load rate(s) specified in the logic control program. The stop command is used to instruct the logic engine to stop executing a given logic control program. When this happens, all currently executing instances of the logic control program will continue to execute until they have completed. No new instances of the logic control program will be allowed to start once this command has been received. The continue command is used to tell the logic engine to start running a given logic control program from the point at which it was stopped. In this case the logic engine will start running the logic control program at the point along the load curve at which it was stopped. The burst command is used to instruct the logic engine to start running several instances of a logic control program at once. If the burst value is set to zero, the burst value stored from the logic control program download item will be used. The statistic commands are used to instruct the logic engine what to do with the current statistical data. These commands should not be issued until all the logic control program data has been downloaded to the logic engine. With these commands the logic engine can start the statistical data reporting, stop the statistical data reporting, clear the statistical data, or set the reporting frequency of the logic engine.

When a logic control program has been defined to transition based on input from the application, the application must be certain to send this event at the appropriate time so the logic control program will transition to the next set of actions. This transition/event combination is mostly useful in a situation that requires user interaction and the logic control program is the only instance that is running. If more than one instance of the logic control program is running, the application must be certain to send the correct key data to the logic engine so the event is passed to the correct instance of the logic control program.

The following describes exemplary types of communication the logic engine sends to the application. An acknowledgement message is returned for every item that is sent to the application that has the acknowledgement flag set in its identifier. The item that requires acknowledgement will be checked for proper formatting, and data validity. If there are any errors the acknowledgement item will return an error code to indicate the type of error. The acknowledgement may not be returned immediately if certain data elements cannot be resolved at the time an item is downloaded. It may be possible to resolve these items when the download is complete, if the unresolved data item was simply downloaded later. Therefore, an application does not wait on the acknowledgement before continuing with its download. Rather, the application "remembers" which items were to be acknowledged and verify that it receives an acknowledgement for each item.

An event message item is returned whenever a send event action item is processed. This item will contain all the data specified in the event action. In this manner, an application can retrieve and store pertinent data from multiple instances of a logic control program for processing and/or for future reference.

Statistics reporting messages are sent to the application after a start statistics reporting command is received. These statistics will indicate the number of instances of a logic control program that have been started, how many passed and failed, and how many completed. A stop reporting command will stop these messages. These messages will be sent on the interval defined in either the statistics frequency data item of the logic control program, or the set frequency command, whichever was received most recently.

The logic engine provides a rich set of functionality for the processing of state data necessary in switching and other systems. This functionality is provided by a specialized, graphical protocol programming language. The graphical programming environment is used to generate the logic control programs. A logic control program contains actions, transitions, and data. It is possible to quickly and efficiently build applications using the graphical programming environment. Similar with graphically-based service creation environments, the programmer may drag, drop and link graphical icons representing logic building blocks to create a logic control program.

Figure 16:
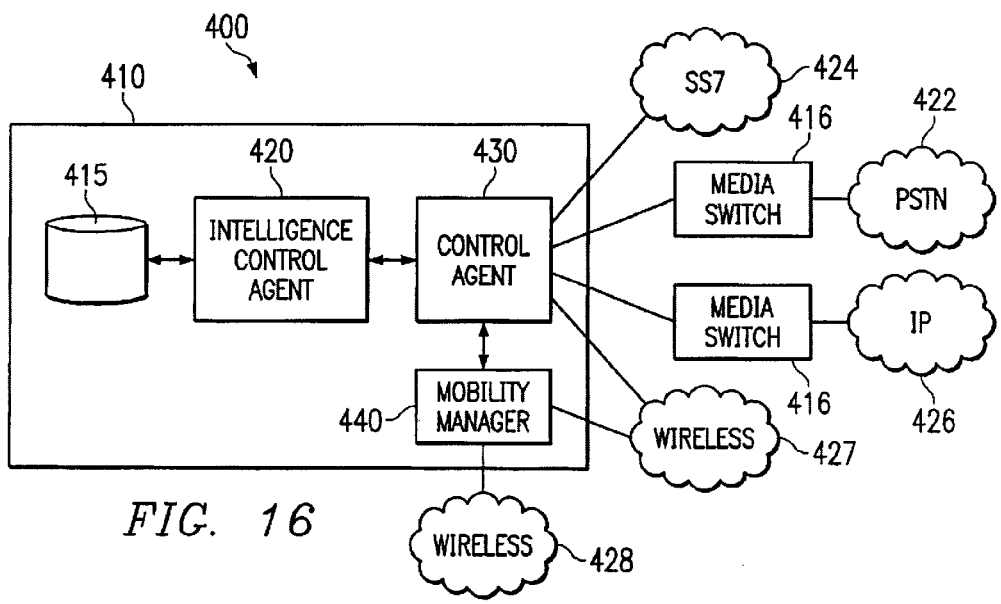
FIG. 16 is a block diagram of one embodiment of a wireless network based on the soft switch of the present invention.

FIG. 16 is a block diagram of one embodiment of a wireless network based on the soft switch of the present invention. Network 400 includes a wireless manager 410, which includes a plurality of agents 420, 430 and 440, and a repository 415. Communication between the agents may be through the use of ISUP+. Control agent 430 interconnects via media switches 416 to various network media, such as PSTN 422 and IP network 426. For example, a call may originate on PSTN 422 and be routed to a media switch 16 via SS7 network 424. As discussed above, wireless networks 427 and 428, which may include but are not limited to, base station radio systems such as AMPs GSM, CDMA and TDMA, and base stations or radio gateways including, but not limited to, GSM, W-CDMA and GPRS, may be coupled to agents 430 and 440.

Each of agents 420, 430, and 440 provide various aspects of call and/or session control for network 400 in a stateless environment. Control agent 430 manages information flow to agent 420 from networks such as PSTN 422 to wireless network 427 and/or 428, while mobility management agent 440 provides hand-over requirements and functionality to provide base station controls for wireless network 427 and/or 428. For example, mobility management agent 440 may manage configuration and/or authentication information such as data from HLR between the RF interface and radio gateways and control agent 420. In general, agents 430 and 440 may provide distributed control intelligence in order to provide functions such as authentication, control and monitoring of calls and/or session traffic between network elements such as base stations, controllers, distributed switches, application software and signaling systems. In this way, network providers may be able to determine implicit or explicit routing, queries, and service requests from anywhere in network. 400.

In operation, agents 430 and 440 do not route bearer channels. Instead, they look for an optimum virtual route from distributed ports on the edge of the network, e.g., a base station RF "channel" utilizing control information as described above. Agents 430 and 440 may work in conjunction with intelligence control agent 420 to provide authentication and verification for origination and termination parties, and route sessions either between adjacent base stations, or across the country using VoIP routing. Mobility management agent 440 is discussed in further detail in conjunction with FIG. 17, and control agent 430 is discussed in further detail with FIG. 18.

In operation, intelligence control agent 420 may receive a message from control agent 430 that indicates the available trunks over which a call event may be routed in response to call processing by control agent 430. Intelligence control agent 420 may select the route accordingly. For example, intelligence control agent 420 may verify the destination requested as a valid telephone number and may calculate the appropriate route to use to terminate the call. For example, intelligence control agent 420 may access repository 415 to verify the cellular users' legitimacy and to secure a subscriber feature profile and other essential services provided to that user for wireline and/or wireless network usage. For example, intelligence control agent 420 may access the user's phone number, exchange information, and/or mobile device identifiers such as an international mobile subscriber identification number (IMSI) and HLR/VLR information. In this way, intelligence control agent 420 may provide stateless database look-up functionality for network 400 and collapses the intelligence and database management required to manage network 400. Such an advantage collapses a variety of databases that would otherwise be required in traditional telephony systems into a single classless, wireless system. For example, repository 415 may include information related to Management Information Systems (MIS), billing, sales, and other departments. Repository 415 also may include subscriberbased services that may be cross-referenced to any of the departments. These services may include, but are not limited to, call forwarding, answering, and follow-me services. Repository 415 may be constructed using a variety of methods, including object oriented relationship and/or hierarchical database techniques. Repository 415 may also include flat files, tables or any other structure suitable for storing and/or retrieving the information desired during call and/or data processing events. Although repository 415 is illustrated in FIG. 16 as locally resident on wireless manager 410, the invention contemplates a use of a variety of functional and/or logical implementations for repository 415. For example, repository 415 may be distributed regionally, nationally, or globally.

Intelligence control agent 420 as used in conjunction with repository 415 may also be particularly advantageous with regard to wireless or mobile devices. For example, a centralized data registry enables new subscriber management, lessens overhead required to maintain and update redundant databases, improves network efficiency by alleviating the requirement to "dip down" to gather subscriber information during a session. For example, such an advantage ties up fewer physical circuits in network 400. In controls, the present invention contemplates the use of IP addresses, which accommodates the use of both standstill and mobile devices that is required for integrating a wireline and wireless network. Intelligence control agent 420 provides the advantage of using a single repository 415 to optimize placement of data registers such as HLR/VLR. For example, the use of traditional, separately-maintained HLR and VLR verification registries are no longer necessary with a single repository 415. Such an advantage also reduces the number of resources and time necessary to process wireless call sessions and/or events. For example, rather than including such information on each of a plurality of switches or in separately-maintained MIS departments in a network, the desired information may be found in a commonly-maintained repository 415. Such an advantage also permits use of intelligence control agent 420 with a variety of existing systems, and allows migration of intelligence control agent 420 to future technologies. Such an advantage reduces duplicated intelligence, data and services that would otherwise be required for each MSC using conventional systems, and may provide portable logic, data, and services independent of physical ports.

Figure 17:
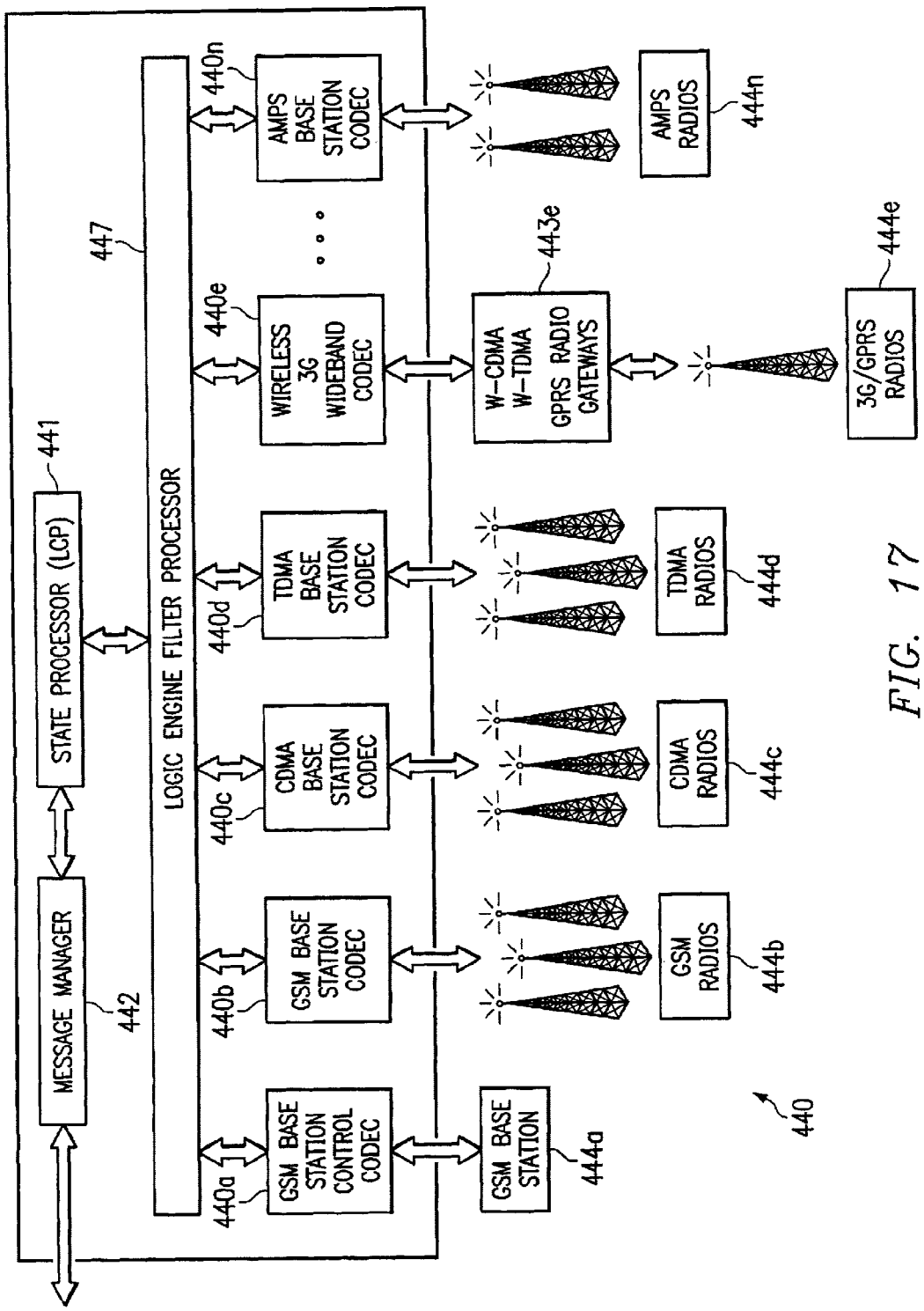
FIG. 17 is a simplified top-level block diagram of an embodiment of a mobility management agent constructed according to the teachings of the present invention.

FIG. 17 is a simplified top-level block diagram of an embodiment of a mobility management agent constructed according to the teachings of the present invention. Mobility management agent 440 provides stateless RF control for wireless interface and protocols by providing hand-over requirements and functionality and controlling base station radios. For example, mobility management agent 440 manages configuration and subscriber information received from intelligence control agent 420, and manages location information received from base station radios over the RF, or air, interface to provide antenna control.

Mobility management agent 440 includes a state processor 441, a message manager 442, logic engine filter processor 447, and a plurality of codecs 440a–440n. Logic engine filter processor 447 is operable to filtering route messages from each of the coders to state processor 441, which is operable to execute a logic control program to process the call event. State processor 441 may communicate with intelligence control agent 420 and/or control agent 430 through message manager 442 using, for example, ISUP+. For example, state processor 441 may communicate available location information to control agent 430 and receive authentication, verification, and routing information from intelligence agent 420. As described above in conjunction with FIGS. 2–15, these codecs are specialized in wireless network protocols and are operable to parse and format messages from wireless networks according to the network protocol. GSM base station control codec 440a is operable to interface with a GSM base station 444a, while GSM base station codec 440b is operable to interface with GSM radios 444b. Similarly, CDMA base station codec 440c and TDMA base station codec 440d are operable to interface with CDMA radios 444c and TDMA radios 444d, respectively. Wireless 3G wideband codec 440e is operable to interface with wideband CDMA, wideband TDMA, and GPRS radio gateways 443e, which are in turn operable to interface with 3G/GPRS radios 444e. AMPS base station code 440n is operable to interface with AMPS radios 444n. In one embodiment of the invention, each codec may create a new state machine for each call session that is initiated. When the call is completed, the circuit state machine may be deleted.

Mobility management agent 440 controls the location of a mobile device on an air interface or airlink between a mobile device and a mobile base station, or antenna. Mobility management agent 440 may be resident, in part, on a mobile device or base station, depending on the application. In one embodiment, data may be structured in packets using cellular digital packet data (CDPD). These packets may be transmitted during pauses in cellular phone conversations and may incorporate functions such as authentication and encryption to improve security. For example, a mobile node may, have one permanent address, another for location purposes and another for identifying it for other network nodes. Data may be transmitted to the permanent address, associated with a "home agent." When the nomadic node is traveling, the "home agent" will forward the data in care of the "foreign agent," the IP server serving the foreign subnet, through a process of encapsulating that data with another IP address contained in the data header preceding the original packet. Once the data packets are received by the foreign agent, the additional header may be removed through a process known as decapsulation. Should the node relocate yet another time, the "home agent" and the previous "foreign agent" will be advised of that fact. In this way, inflight packets may be forwarded by the previous foreign agent to a new foreign agent through a process known as "smooth handoff."

A variety of methods may be used to handoff a cellular phone from one cell to another, and these methods are typically dependent on the wireless network technology that is used. For example, CDPD may work with AMPS, TDMA, and CDMA networks. A Mobile Telephone Switching Office (MTSO) may pass a cellular telephone conversation from one cell to another in a handoff depending on signal strength. For example, state processor 441 may constantly monitor strength of both the caller and the receiver signals, and then locate a next best cell site to re-route the conversation to maintain the communication link. State processor 441 may respond to logic in which the control channels tell each cellular unit when and where to switch. While in motion, if signal strength begins to fade, the telephone will automatically switch signal frequencies or cells as necessary without operator assistance. Hard handoffs, which are performed on a "break and make" basis, require a connection to be broken in the original cell before it may be made in a successor cell. Hard handoffs are required in cellular systems using frequency division multiple access (FDMA) such as AMPS, and TDMA, such as GSM. On the other hand, soft handoffs may be used in systems such as TDMA, which does not require the use of different frequencies in adjacent cells. A soft handoff typically employs a "make and break" handoff algorithm.

Mobility management agent 440 utilizes the normalized IP signal to exchange required data for verification, authentication, and routing. Such an advantage may improve the efficiency of network 400. For example, rather than requiring intermachine trunking switching through a plurality of switches which may introduce conferencing or bridging effects associated with conventional systems, wireless manager 410 may abide by the rules of each protocol and provide such functions in a single stateless transaction. Moreover, wireless manager 410 may reduce the number of circuits or ports required to handle a call and/or hand-over process so that is not dropped or disconnected, and/or so that no interruption is heard in service. Such an advantage may introduce efficiencies such as increased capacity between a base station and mobility management agent 440. For example, codecs may seize a channel and allocate it to a certain RF frequency rather than seizing and reserving the channel. This allows more resources to be directed to accommodate changes in capacity or demand. For example, the control agent may dynamically, rather than statically, allocate a channel between a radio and a switch and between a radio and each antenna. Such an advantage may also allow improved power management, and/or may increase the scalability of network 400.

Figure 18:
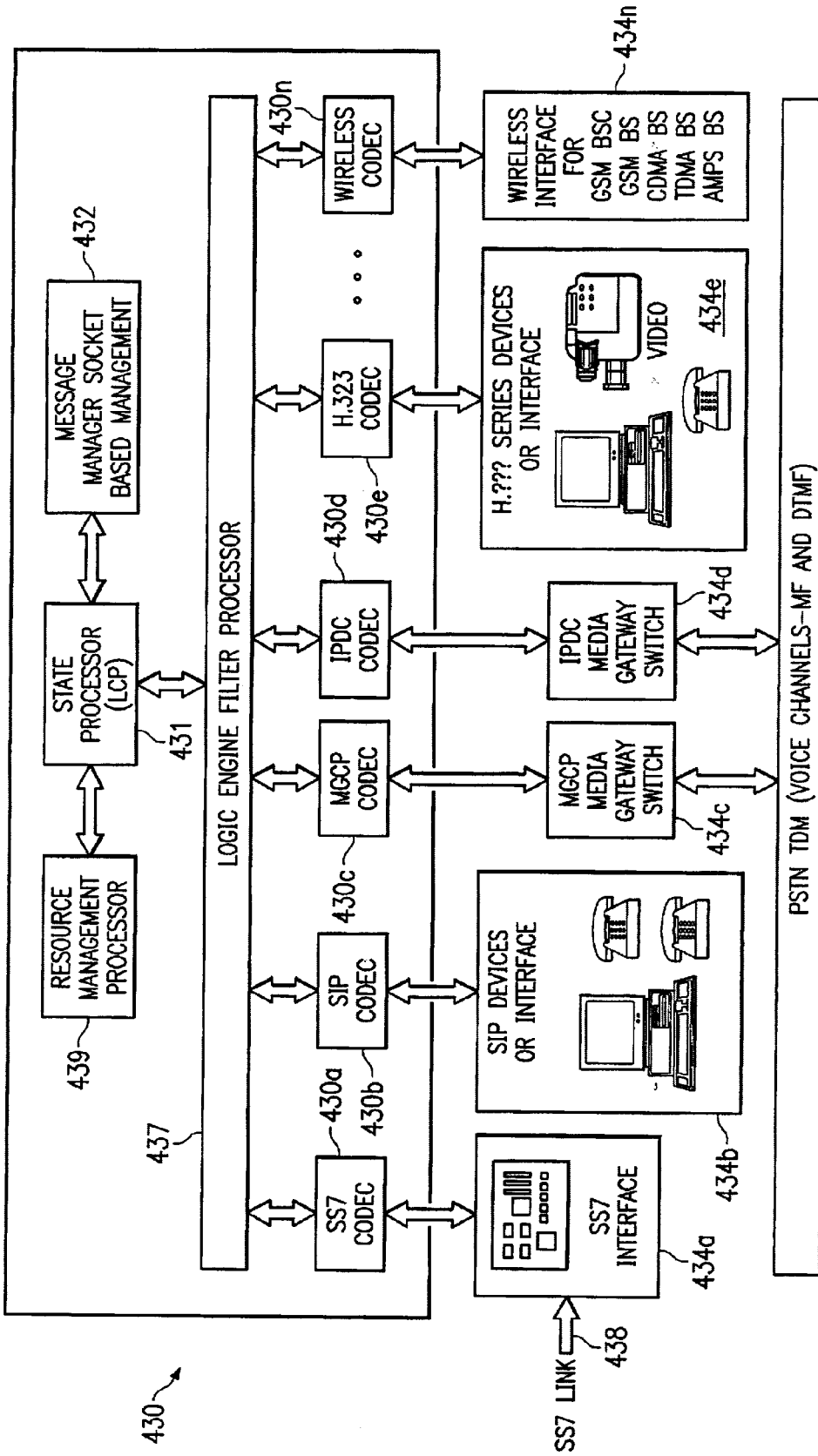
FIG. 18 is a simplified top-level block diagram of an embodiment of a control agent constructed according to the teachings of the present invention.

FIG. 18 is a simplified top-level block diagram of an embodiment of a control agent constructed according to the teachings of the present invention. Control agent 430 includes a state processor 431, a message manager 432, a resource management processor 439, a logic engine filter processor 437, and a plurality of codecs 430*a*–430*n*. Control agent 430 may be used as resource management for, for example, PSTN interconnectivity and a backbone packet network such as IP or ATM. Control agent 430 manages information flow to intelligence control agent 420 from a network such as PSTN 422 to wireless networks 427 and/or 428, through the air interface, and in some embodiments to an actual mobile device. In operation, logic engine filter processor 437 is operable to filter and route message from each of the codecs to state processor 431, which is operable to execute a logic control program to process the call event. State processor 431 may communicate with intelligence control agent 420 and/or mobility management agent 430 for routing, verification, and authentication of wireless call events as they are processed through network 400. Resource management processor 439 may determine and store the available trunks associated with, for example, PSTN 422 and IP network 426 that are in use; therefore, resource management processor 439 knows which trunks are out of service. Resource management processor 439 may inform intelligence control agent 420 of the available trunks over which a call may be routed in response to call processing by state processor 431, and intelligence control agent 420 may select the route accordingly. Intelligence control agent 420 in conjunction with resource management processor 439 may verify the destination requested as a valid telephone number and will calculate the appropriate route used to terminate the call. State processor 431 and intelligence agent 420 may process a call using entries in repository 415 that may be easily modified. As a result, the way in which calls are processed may be changed efficiently without the complex programming typically associated with routing calls. State processor 431 may determine the route to use to complete the call request and to formulate a message to be sent, and provides the determined route to resource management processor 439 to choose a route or an outbound circuit.

Codecs 430*a*–430*n* are also each specialized in a variety of network protocols and operable to parse and format messages from the network according to each specialized network protocol. For example, SS7 codec 430*a* is operable to parse and route SS7 signaling messages from an SS7 interface 434*a*, and SIP codec 430*b* is operable to parse and route SIP signaling messages from SIP devices or interfaces 434*b*. MGCP codec 430*c* and IPDC codec 430*d* are operable to interface with MGCP media gateway switch 434*c* and IPDC media gateway switch 434*d*, respectively. Similarly, H.323 codec 430*e* is operable to parse and route H.323 signaling messages from H.XXX series devices or interfaces 434*e*. Wireless code 430*n* is operable to parse and route signaling messages from a wireless interface 434*n*. As discussed in conjunction with FIG. 17 these protocols may include, but are not limited to, AMPS, CDMA, TDMA, GSM, GDRS, and other wireless protocols.

The invention also contemplates a variety of logical and/or functional configurations for intelligence control agent 420, control agent 430 and mobility management agent 440. For example, although FIG. 16 illustrates a centralized wireless manager 410, the invention also contemplates distribution of portions of wireless manager 410 to the edge of network 400 as technology permits. For example, where wireless networks converge to a common packet-enabled communication protocol such as IP, wireless networks 427 and 428 in essence converge. Wireless manager 410 may then interface directly to wireless devices in wireless networks 427 and 428 through an IP network, as is discussed in further detail in conjunction with FIG. 19.

Figure 19:
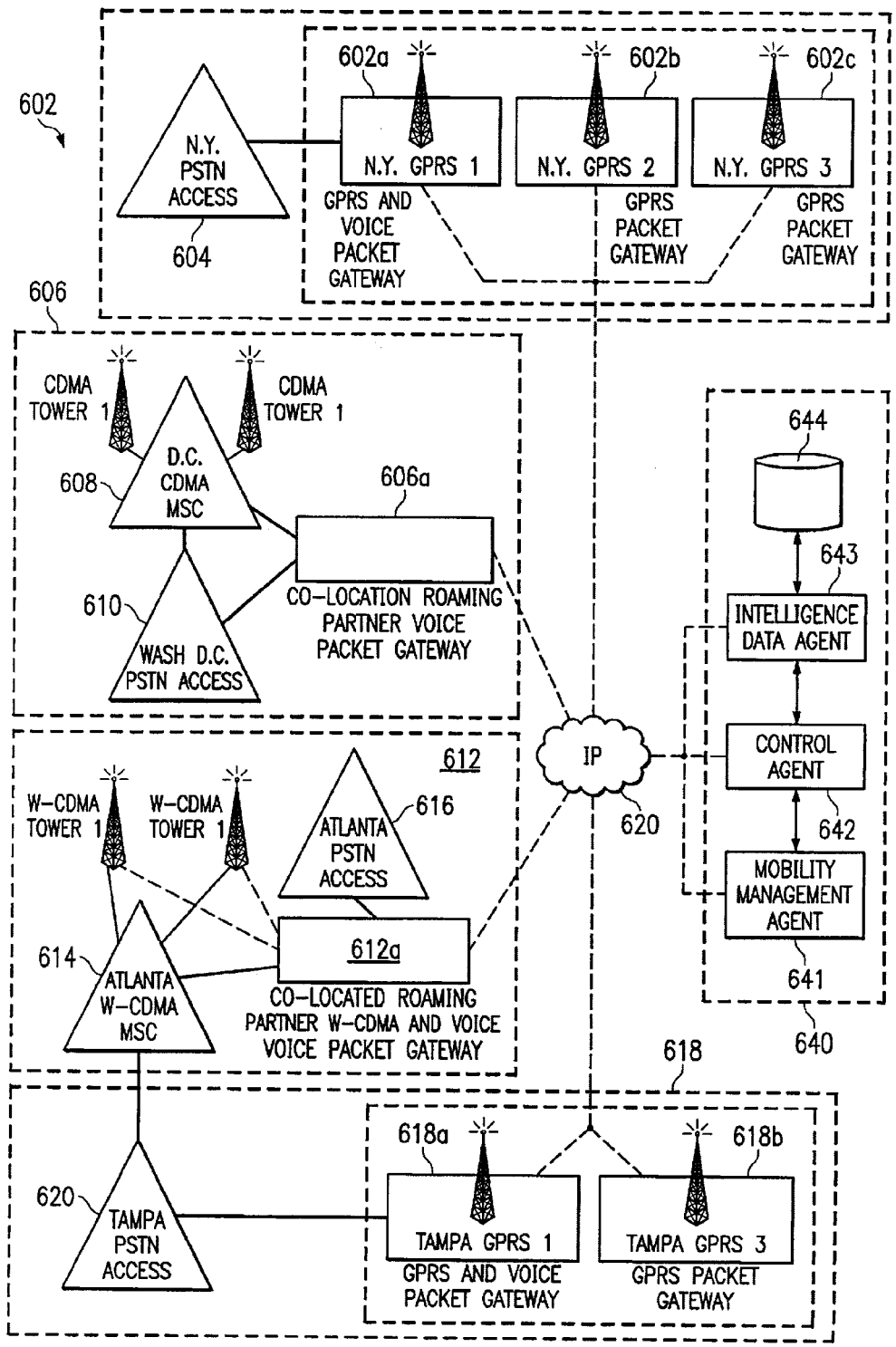
FIG. 19 graphically illustrates a method for internetworking a variety of wireless networks as a mobile phone user roams through four service areas.

FIG. 19 graphically illustrates a method for internetworking a variety of wireless networks as a mobile phone user roams through four service areas. The method graphically illustrates roaming from a New York service area 602, through a Washington, D.C. service area 606 and an Atlanta service area 612, and terminating in a Tampa, Fla. service area 618. FIG. 19 illustrates an ideal network 600 that includes wireless manager 640 operable to communicate with the four service areas 602, 606, 612, and 618 through an IP, or packet-enabled network 620. In such an embodiment, mobile devices such as cellular phones or PDA's may include portions of wireless manager 640. For example, wireless devices may include at least a portion of mobility management agent 641 and control agent 642. Thus, in operation, the wireless device may process call events from codecs and filters residing in mobility management agent 641 and control agent 642, which may then be processed by intelligence control agent 643 via IP network 620. The invention contemplates a number of logical and functional implementations as technology permits. Such a network may be advantageous because base station controller algorithms for current technologies such as GSM, TDMA, CDMA utilize hand off algorithms that currently require a re-initiation of a session when and/or if the user switches between technologies. As technology develops, IP protocols may be used to avoid such session reinitiation when transferring from one technology or service area to another when roaming. For example, in network 600, wireless manager 640 may allocate an origination IP port and a termination IP port that may remain, and be mobile, with the user.

In such an embodiment, wireless manager 640 may include logic that controls hand-offs between management base stations and a handset using, for example, triangulation results. The invention contemplates that future technologies will allow TCP/IP or other packet-enabled mobility. For such TCP/IP or other packet-enabled mobility, cell sites may decrease in radius, and logic may use similar signal strength comparison techniques in conjunction with additional correlation techniques for handoffs of the handset. For example, signals such as ACK/NAK signals may be sent to routers and switches, or an acknowledgement signal may be sent to surrounding sites to determine whether a person is on or off line, using a private or in-home line, or on a public system. These techniques may increase the self awareness of network 600.

The method begins when a user accesses a New York PSTN 604 in the New York service area 602 through GPRS and voice packet gateway 602a, and GPRS packet gateways 602b and 602c. In this example, GPRS and voice packet gateway 602a includes voice and extended IP services. Thus, when the user is in proximity of gateway 602a, his device will be IP and voice-enabled, and when his device switches to either of gateways 602b or 602c, his device is voice-enabled only.

As the user roams through the Washington, D.C. service area 606, wireless manager 640 switches the call to a CDMA mobile switching center (MSC) 408 that is accessible through voice packet gateway 606a. A user may access Washington, D.C. service center 606 through either CDMA MSC 608, the Washington, D.C. PSTN access 610, or a combination of the two. As illustrated, the user may only receive voice data as he roams through the Washington, D.C. area.

Similarly, as the user roams further, the user may be switched to the Atlanta service area 612 to a W-CDMA mobile switching center (MSC) 614 and/or the Atlanta PSTN access 616 through W-CDMA and voice packet gateway 612a. As illustrated, the user's device is IP and voice-enabled as he roams through the Atlanta area. As the user roams into the Tampa service area 618, the user may access the Tampa PSTN 620 through GPRS and voice packet gateway 618a and/or -CDMA MSC 614, and GPRS packet gateway 618b. In this example, GPRS and voice packet gateway 618a includes voice and extended IP services. Thus, when the user is in proximity of gateway 618a, his device will be IP and voice-enabled, and when his device switches to gateway 616b, his device is voice-enabled only.

The invention contemplates improvements in scalability over existing technology, where time-sensitive data content is typically gathered via MGCP, and throughput is typically limited to a certain capacity. Because such content gathering is tied to a physical port and/or device, existing networks typically allocate and seize a channel to provide "on hook" connection between an origination and a termination point. The invention may eliminate at least some of these requirements for such content gathering to be tied to a physical port and/or device, by allocating instead a single origination and a single termination point in IP network 620. Network 600 contemplates allocating and reserving, rather than allocating and seizing, channel to provide connection between the origination and termination point. Furthermore, use of intelligence control agent 643 and repository 644 remove tiering effects resulting from existing intermachine trunking switching that is required to exchange data between two protocols while providing verification, authentication, and routing information. Moreover, network 600 may enable the seamless use of a variety of wireless networks without the need for session reinitiation.

A variety of configurations, both logical and functional, are contemplated within the scope of the invention. For example, it may be desirable for each softswitch to be centralized. On the other hand, in some applications, it may be advantageous for some aspects of the soft switch to be distributed. For example, some or all codecs may reside at the edge, or in individual devices. For example, W-CDMA codecs may reside on personal mobile devices, and SIP codecs may reside on SIP-enabled devices such as SIP-enabled phones. In addition, multiple agents may reside in one control processor. Furthermore, a plurality of codecs may be grouped into agents, depending on interfaces, feeds, and bandwidth supported by a particular application. In addition, functionality that may be common for many soft switches and/or components thereof, such as logic engines, may be partitioned into a single component. This component may then be used by a plurality of soft switches and/or components thereof. Alternatively or in addition, each function may be replicated for each soft switch.

In a particular embodiment, it may be advantageous to distribute functionality so that each call processing node, or soft switch, is coupled to a network management function, and at least one database by a communication link such as a LAN or WAN. Each of these call processing nodes, databases, and network management functions may reside on its own or a common server, in any combination. Similarly, distributor functions may be partitioned separately from resource manager functions. Distributor functions may be grouped into a logical or a functional configuration. For example, it may be advantageous to provide DGM&S SS7, SIP, Q931, and MGCP codecs into one node. Distributor and resource manager functions may also reside on separate or the same servers, and are also coupled to the communication link to communicate with call processing nodes, database, and network management functions. In addition, each distributor node may also be coupled to at least one communication link that is coupled to one or more media gateways.

The solution set also comprises network management, billing, and LDAP (lightweight directory access protocol) servers. The software development for the solution set (applications, servers, interfaces, translation and routing, etc.) may use object oriented programming software and techniques, such as CORBA, C++, JAVA, ObjectStore (OODBMS), and VisiBroker (CORBA), and the like.

This invention may be used by data communication companies, voice communication companies, ISPs, CLECs, LECs, long distance providers, wireless communication companies, etc., to interface to other networks such as ATM (asynchronous transfer mode), frame relay, SIP, H.323, Internet, voice, wireless, etc. Although the description of the invention and claims describe specific signaling and transport protocols, it is contemplated that the present invention is designed to interface with and handle emerging and future protocols. In addition, the present invention may be implemented in hardware, software or a combination of hardware and software. It should be noted that many of the block diagrams illustrate functional groupings which may be implemented in alternative embodiments.

Although the present invention has been described in several embodiments, myriad of changes, variations, alterations, transformations and modifications may be suggested to one skilled in the art, and it is intended that the present invention encompass such changes, variations, alterations, transformations, and modifications as fall within the spirit and scope of the appended claims.

What is claimed is:

1. A protocol-independent system for processing a wireless call event, comprising:
   at least one control agent having
      a first generic logic control state machine operable to execute a first logic control program to process a signaling message;
      a first signaling codec specialized in a particular wireless signaling protocol and operable to parse and format the signaling messages; and
      a first filter operable to filter and route the signaling messages from the codec to the first logic control state machine;
   at least one mobility management agent having
      a second generic logic control state machine operable to execute a second logic control program to process a control protocol message;
      a second codec specialized in a particular wireless control protocol and operable to parse and format the control protocol messages; and
      a second filter operable to filter and route the control protocol messages from the codec to the second logic control state machine; and
   at least one intelligence control agent having
      a third generic logic control state machine operable to execute a third logic control program to process call events received from the mobility management agent and the control agent; and
      access to a database, the database including routing and verification information related to the call event.

2. The system, as set forth in claim 1, wherein the intelligence control agent is operable to parse and route one of the group selected from AMPS signaling messages, CDMA signaling messages, GSM signaling messages, and TDMA signaling messages.

3. The system, as set forth in claim 1, wherein the second codec is operable to interface with one of the group selected from a GSM base station, a W-CDMA radio gateway, a W-TDMA radio gateway, a GPRS radio gateway, and a GSM receiver, a CDMA receiver, a TDMA receiver, and an AMPS receiver.

4. The system, as set forth in claim 1, wherein the intelligence control agent is further operable to access a database that includes routing and verification information related to the call event and to route the call event in response to the information.

5. The system, as set forth in claim 4, wherein the mobility management agent is further operable to route the call event using voice over IP.

6. The system, as set forth in claim 1, wherein the control agent further includes another codec operable to parse and route one of the group selected from H.323 signaling messages and SS7 signaling messages.

7. The system, as set forth in claim 1, wherein the second codec is operable to allocate an RF channel that may be used for the call event without seizing the RF channel.

* * * * *

UNITED STATES PATENT AND TRADEMARK OFFICE
CERTIFICATE OF CORRECTION

PATENT NO. : 6,996,076 B1　　　　　　　　　　　　　　　　　　　　Page 1 of 1
APPLICATION NO. : 09/821508
DATED : February 7, 2006
INVENTOR(S) : Kaczmarczyk et al.

It is certified that error appears in the above-identified patent and that said Letters Patent is hereby corrected as shown below:

Under the Background of the Invention Section in column 1 line 38, please change DMA1 to read CDMA1.

Under the Detailed Description of the Invention Section in column 6 line 9, please add the number 50 after the word "architecture" and before the word "using".

Under the Detailed Description of the Invention Section in column 9 line 11, please delete the word "pack-etswitched" and replace it with the word "packet-switched"

Under the Detailed Description of the Invention Section in column 16 line 7, please delete the word "controls" and replace it with the word "contrast".

Under the Detailed Description of the Invention Section in column 16 line 45, please delete the word "coders" and replace it with the word "codecs".

Under the Detailed Description of the Invention Section in column 17 line 14, please delete the comma after the word "may".

Signed and Sealed this

Eighth Day of August, 2006

JON W. DUDAS
*Director of the United States Patent and Trademark Office*